(12) United States Patent
Mooney et al.

(10) Patent No.: US 8,540,526 B2
(45) Date of Patent: Sep. 24, 2013

(54) ADJUSTABLE ELECTRICAL BUSWAY JOINT

(75) Inventors: Brian Frederick Mooney, Colchester, CT (US); Michael Richard Wood, Southington, CT (US); Jeffery Lynn Cox, Selmer, TN (US); Gerald Witkoski, Burlington, CT (US); Mariusz Duda, Windsor Locks, CT (US); Mark Schatz, Plainville, CT (US); Kuldeep Kumar Bhathija, Andhra Pradesh (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/338,469

(22) Filed: Dec. 28, 2011

(65) Prior Publication Data

US 2013/0171850 A1 Jul. 4, 2013

(51) Int. Cl.
*H01R 4/60* (2006.01)
(52) U.S. Cl.
USPC ............................................ 439/213; 174/86
(58) Field of Classification Search
USPC ................. 439/212, 213; 174/68.2, 86, 88 B
See application file for complete search history.

(56) References Cited

U.S. PATENT DOCUMENTS

| | | | |
|---|---|---|---|
| 3,031,521 A | 4/1962 | Krauss et al. | |
| 3,462,541 A | 8/1969 | Davis et al. | |
| 3,559,148 A | 1/1971 | Hafer | |
| 4,728,752 A | 3/1988 | Hicks, Jr. et al. | |
| 4,849,581 A | 7/1989 | Larkin et al. | |
| 4,950,841 A | 8/1990 | Walker et al. | |
| 5,442,135 A | 8/1995 | Faulkner et al. | |
| 5,738,779 A | 4/1998 | Dach et al. | |
| 5,785,542 A | 7/1998 | Johnson | |
| 5,821,464 A | 10/1998 | Graham et al. | |
| 7,718,895 B2 | 5/2010 | Rodriguez | |
| 8,033,850 B2 * | 10/2011 | O'Leary et al. | 439/213 |
| 8,289,680 B2 * | 10/2012 | Keegan et al. | 361/611 |
| 8,333,620 B2 * | 12/2012 | Komatsu | 439/708 |

FOREIGN PATENT DOCUMENTS

| | | |
|---|---|---|
| EP | 0933855 B1 | 5/2001 |
| WO | 2011067647 A2 | 6/2011 |

OTHER PUBLICATIONS

DBTS Industries SDN.BHD, "Medium Voltage Busbar Trunking Systems Busway", product catalog, pp. 1-10, (Jun. 2012).
Eaton Corporation "Pow-R-Way III Low Voltage Busway", product catalog, pp. 1-11.
Search Report and Written Opinion from EP Patent Application No. 12197438.0 dated May 27, 2013.

* cited by examiner

*Primary Examiner* — Khiem Nguyen
(74) *Attorney, Agent, or Firm* — Global Patent Operation; Stephen G. Midgley

(57) ABSTRACT

An adjustable length busway joint for coupling a first and a second busway section, the first and second busway sections being longitudinally offset, is disclosed. The busway joint includes a first plurality of splice plates and a second plurality of splice plates disposed to overlap to form an electrical joint. The first and said second pluralities of splice plates are arranged for a longitudinal movement with respect each other between a first compressed position and a second extended position. The busway joint further includes a third plurality of splice plates. Each splice plate of the second plurality of splice plates overlaps a portion of a corresponding splice plate of the third plurality of splice plates to form an electrical joint. The third and second pluralities of splice plates are arranged for a longitudinal movement with respect each other between a third compressed position and a fourth extended position.

22 Claims, 17 Drawing Sheets

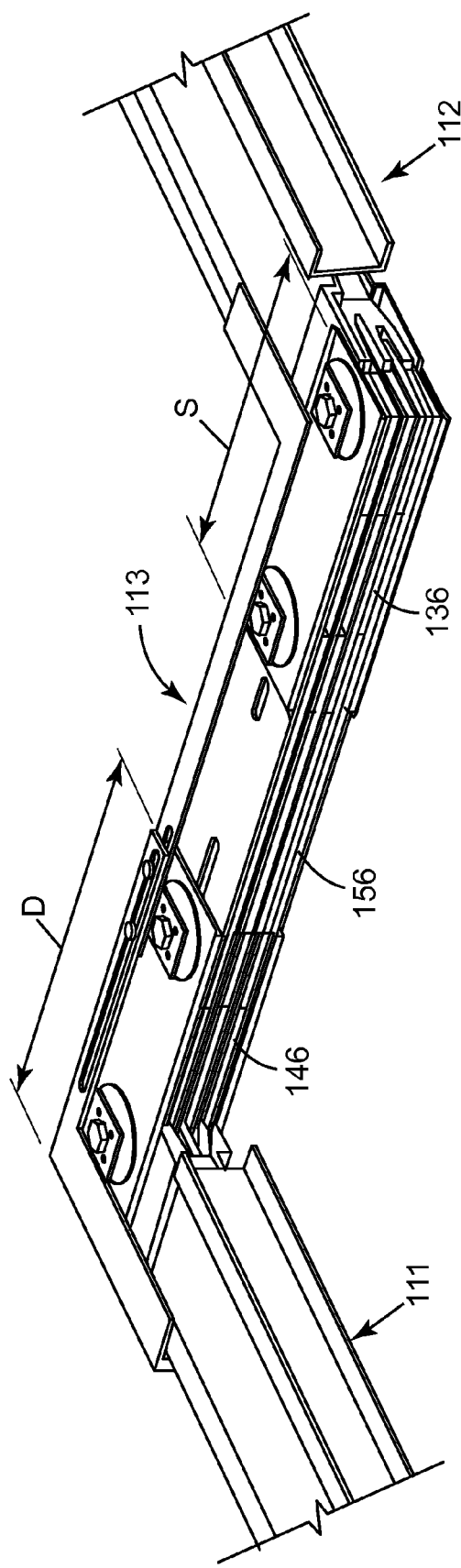

ADJUSTABLE ELECTRICAL BUSWAY JOINT

BACKGROUND OF THE INVENTION

The embodiments described herein relate generally to electrical busway and, more particularly, to an adjustable joint for joining electrical busway sections.

Elongated rectangular flat conductive bus bar members are conventionally insulatively arranged within electrical busway sections for transporting multi-phase high current electric power through industrial establishments. Successive elongate busway sections are electrically connected or interlocked together in end-to-end relation to provide electrical continuity between a power source and a power consuming load.

When offset or non-longitudinally aligned busway sections are electrically interconnected in a conventional installation, one or more self-contained busway joint is typically employed. In order to preserve the thermal properties of the individual busway sections, the busway joint is conventionally constructed with electrically conductive splice plates and interleaving insulative plates fixedly held together by insulative bolts.

Busway sections are generally manufactured and distributed in the form of pre-manufactured fixed-length sections, so that a number of such electrical busway joints are required to install an extended length busway run in an industrial facility. At each junction between two fixed-length busway sections, a busway joint is necessary to electrically connect the two busway sections.

In many cases, the fixed-length sections are longitudinally offset from each other in a given installation. As a result, two custom length busway joint elbows need to be manufactured, adding significant cost and time to the installation. For example, installers typically need to order non-standard or custom length bus way offset elbow joints to complete an installation. The custom length busway elbows joints typically need to be manufactured to a specified length and the installer has to wait until it is delivered to finish installation of the busway run.

It would be desirable to provide a busway joint having an adjustable length to cooperate with adjacent longitudinally-offset busway sections to eliminate the need for a custom length busway joints and elbow joints. It would further be desirable to provide a busway system that allows an installer to order an adjustable busway joint at the same time as ordering the busway sections. It would also be desirable to provide a longitudinally adjustable busway joint configured to couple two non-aligned busway sections.

BRIEF DESCRIPTION OF THE INVENTION

In an embodiment, an adjustable length busway joint for coupling a first and a second busway section, the first and second busway sections being longitudinally offset, is disclosed. The busway joint includes a first plurality of splice plates, each defining a first splice plate first retaining portion; and a second plurality of splice plates, each splice plate of the second plurality of splice plates disposed to overlap a portion of a corresponding splice plate of the first plurality of splice plates to form an electrical joint. Each splice plate of the second plurality of splice plates defines a splice plate first adjustment portion substantially longitudinally aligned with the first plurality of splice plates and operably disposed to overlap a portion of the first splice plate first retaining portion. The joint also includes at least one first positioning member sized and configured to be operably disposed in the first splice plate first retaining portion and said second splice plate first adjustment portion. The first and said second pluralities of splice plates are arranged for a longitudinal movement with respect each other between a first compressed position and a second extended position. The joint further includes a third plurality of splice plates, each defining a third splice plate first retaining portion. Each splice plate of the second plurality splice plates is further disposed to overlap a portion of a corresponding splice plate of the third plurality of splice plates to form an electrical joint. Each splice plate of said second plurality of splice plates further defines a splice plate second adjustment portion substantially longitudinally aligned with the third plurality of splice plates and operably overlaps a portion of the third splice plate first retaining portion. At least one second positioning member is operably disposed in the splice plate second adjustment portion and the third splice plate first retaining portion. The third and said second pluralities of splice plates are arranged for a longitudinal movement with respect each other between a third compressed position and a fourth extended position.

In another embodiment, a busway system is disclosed. The busway system includes a first and a second busway section, the first and second busway sections being longitudinally offset, and a busway joint disposed between and operative to couple the first and said second busway sections. In an embodiment, an adjustable length busway joint for coupling a first and a second busway section, the first and second busway sections being longitudinally offset, is disclosed. The busway joint includes a first plurality of splice plates, each defining a first splice plate first retaining portion; and a second plurality of splice plates, each splice plate of the second plurality of splice plates disposed to overlap a portion of a corresponding splice plate of the first plurality of splice plates to form an electrical joint. Each splice plate of the second plurality of splice plates defines a splice plate first adjustment portion substantially longitudinally aligned with the first plurality of splice plates and operably disposed to overlap a portion of the first splice plate first retaining portion. The joint also includes at least one first positioning member sized and configured to be operably disposed in the first splice plate first retaining portion and said second splice plate first adjustment portion. The first and said second pluralities of splice plates are arranged for a longitudinal movement with respect each other between a first compressed position and a second extended position. The joint further includes a third plurality of splice plates, each defining a third splice plate first retaining portion. Each splice plate of the second plurality splice plates is further disposed to overlap a portion of a corresponding splice plate of the third plurality of splice plates to form an electrical joint. Each splice plate of said second plurality of splice plates further defines a splice plate second adjustment portion substantially longitudinally aligned with the third plurality of splice plates and operably overlaps a portion of the third splice plate first retaining portion. At least one second positioning member is operably disposed in the splice plate second adjustment portion and the third splice plate first retaining portion. The third and said second pluralities of splice plates are arranged for a longitudinal movement with respect each other between a third compressed position and a fourth extended position.

BRIEF DESCRIPTION OF THE DRAWINGS

FIG. 10 is a perspective view of according to an alternative embodiment of a busway system, in a second extended position with one of the busway joint housing sides removed for clarity.

DETAILED DESCRIPTION OF THE INVENTION

As used in this description and in the claims which follow, the term "phase" shall be taken to include all conductors in different runs of any particular busway, bus duct, or bus joint which carry the same electrical phase, and including those conductors which are used to carry any neutral or ground phase.

Various embodiments disclosed herein provide a busway joint which is adjustable by a user to any desired length. Embodiments use a splice-plate style pressure joint to couple two longitudinally offset busway sections. The splice plates comprising the joint are longitudinally moveable with respect to each other between a first compressed position and a second extended position such that the busway joint length is likewise adjustable.

Exemplary embodiments comprise a first set of splice plates, each respectively defining a first splice plate first retaining portion, and a second set of splice plates each respectively defining a second aperture arranged to define a first adjustment portion and a second adjustment portion. Embodiments additionally comprise a third set of splice plates, each respectively defining third splice plate first retaining portion. The first and second sets of splice plates, and the first splice plate first retaining and second splice plate first adjustment portions are respectively disposed to overlap, and a positioning member is disposed in the overlapping first retaining and first adjustment portions. The second and third sets of splice plates, and the second splice plate second adjustment portion and third splice plate first retaining portions are respectively disposed to overlap, and a second positioning member is disposed in the overlapping second splice plate second adjustment portion and third splice plate first retaining portions. In an embodiment, the first splice plate first retaining, second splice plate first adjustment portions, and first positioning member cooperate to at least partially define the distance between a first compressed position and the second extended position.

In an embodiment, the third splice plate first retaining, second splice plate second adjustment portions and second positioning member cooperate to at least partially define the distance between a third compressed position and a fourth extended position. Once the busway joint is adjusted to a desired length, the positioning member may be fixedly clamped or tightened by a user to prevent undesired length adjustment. Subsequent adjustment of busway joint length may be made after releasing or loosening the positioning member with respect to the splice plates. In some embodiments, metal housing surfaces or plates are used to enclose the splice plates, and may similarly be moveable with respect to each other between a first compressed position and a second extended position such that the busway joint length is likewise adjustable.

Figure 1:
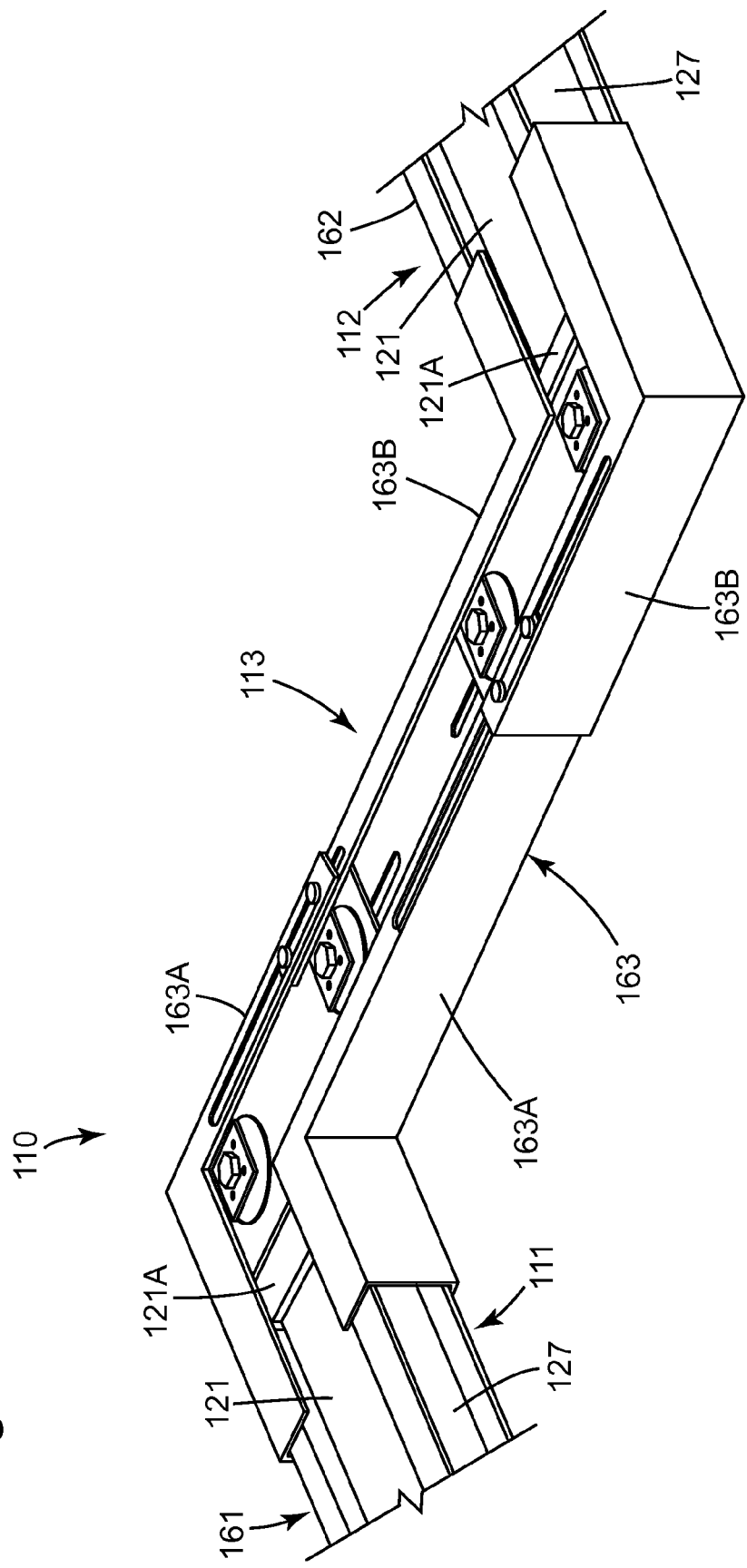
FIG. 1 is a perspective view of a non-longitudinally aligned busway system in an connected state according to an exemplary embodiment.

According to an embodiment, as shown in FIG. 1, a busway system 110 comprises an elongate first busway section 111, and an elongate second busway section 112 joinable in a substantially longitudinally offset, end-to-end relation between an electric power source (not shown) and a load (not shown) via a separate removable and longitudinally adjustable busway joint 113. In one embodiment, the busway system 110 is configured to connect to a conventional 3-phase electrical distribution system (not shown). In other embodiments, busway system 110 may be configured to connect with an electrical distribution system having any number of AC electrical phases. In still other embodiments, busway system 110 may be configured to connect with a DC electrical distribution system.

Figure 2:
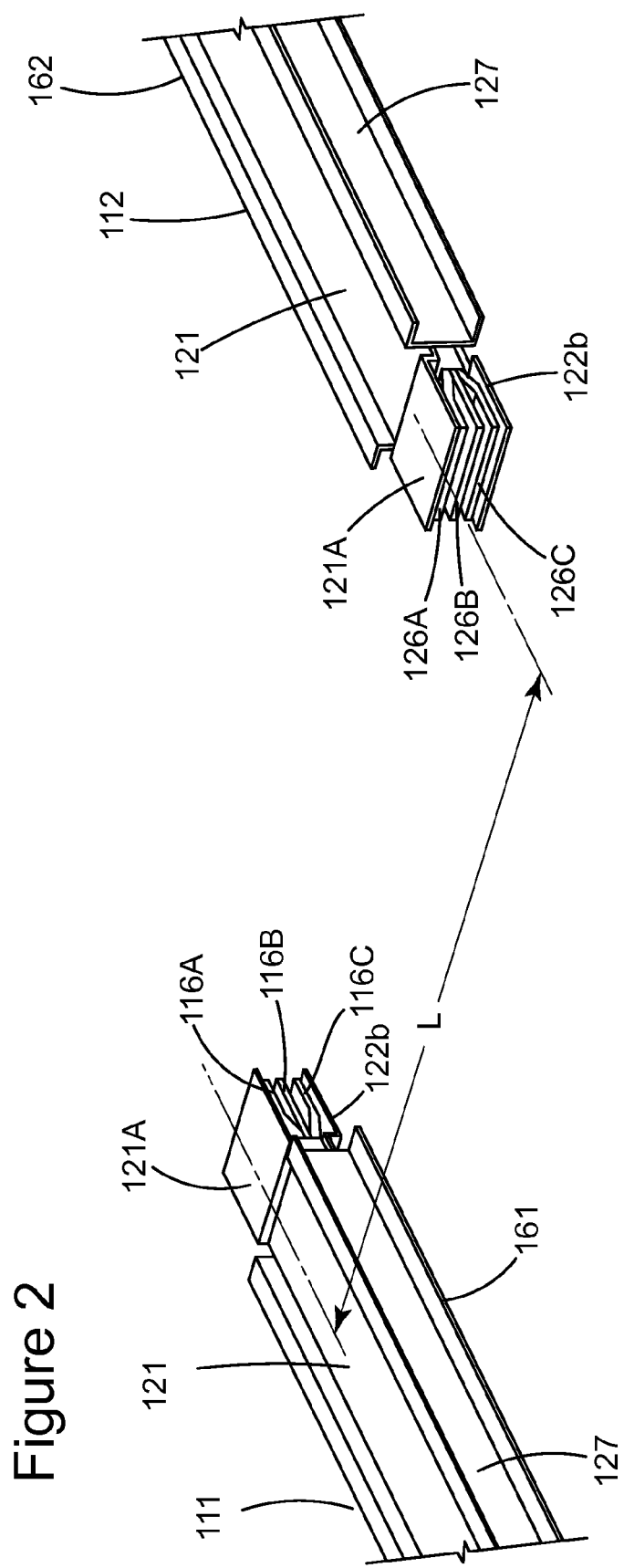
FIG. 2 is a perspective view of the exemplary embodiment of the busway system of FIG. 1 with the busway joint removed for clarity.

In an embodiment, as illustrated in FIG. 2, first and second busway sections 111, 112 are shown as longitudinally offset by a distance "L". The first busway section 111 comprises an elongate busway housing 161 and a plurality of runs of generally flat elongate bus bars 116A, 116B, and 116C positioned within the busway housing 161. In an embodiment, each of the bus bars 116A-116C are associated with a specific electrical phase of an electrical distribution system, and configured for operable connection with a corresponding phase, ground, or neutral bus within the electrical distribution system. In other embodiments, each of the plurality of bus bars 116A-116C may comprise a plurality of electrically coupled bus bars, each set being associated with a specific electrical phase, ground, or neutral of the electrical distribution system.

Similarly, in an embodiment, the second busway section 112 comprises an elongate housing 162 and a plurality of runs of generally flat elongate bus bars 126A, 126B, and 126C, positioned within the housing 162. In an embodiment, each of the bus bars 126A-126C are associated with a specific electrical phase of an electrical distribution system, and configured for operable connection with a corresponding phase, ground, or neutral bus within the electrical distribution system. In other embodiments, each of the plurality of bus bars 126A-126C may comprise a plurality of electrically coupled bus bars, each set being associated with a specific electrical phase, ground, or neutral of the electrical distribution system.

While the first and second busway sections 111, 112 are shown in the figures and discussed herein as each comprising three bus bars, it should be understood that other embodiments are not so limited and first and second busway sections 111, 112 may each comprise any desired number of busbars and any desired number of busbars per electrical phase, ground, or neutral that enables busway system 110 to function as described herein.

Figure 4:
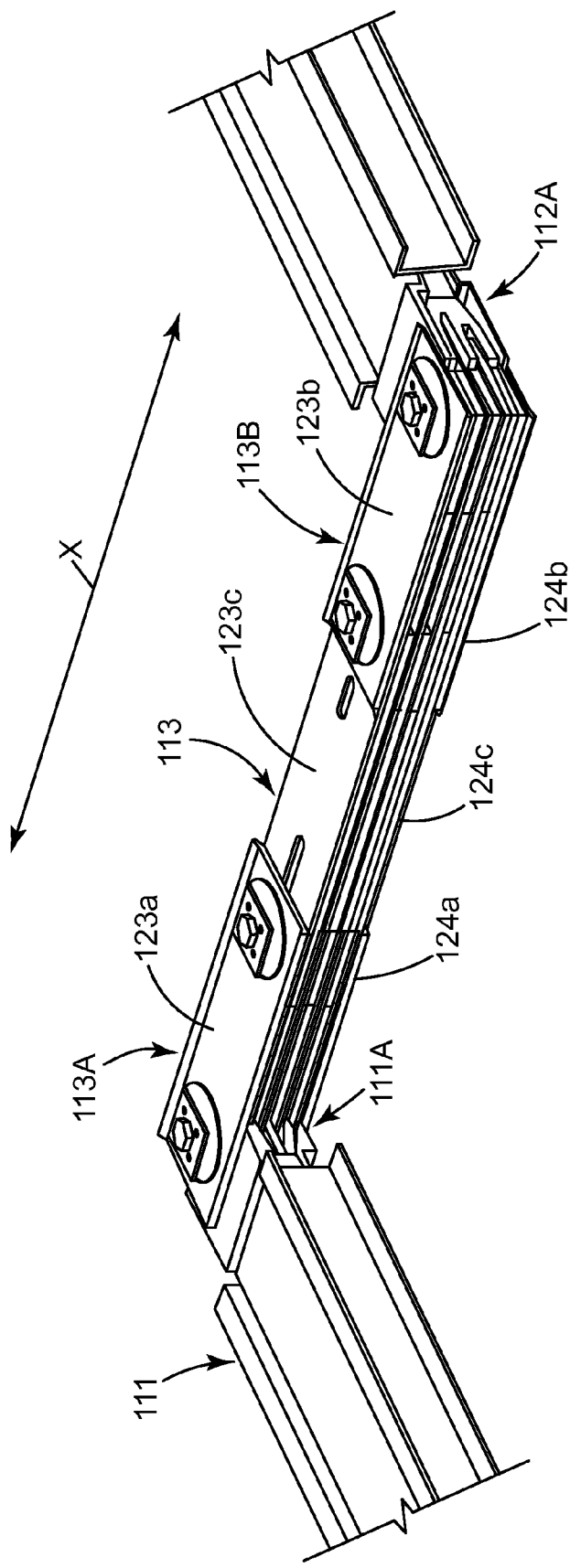
FIG. 4 is a perspective view of an exemplary embodiment of the busway system of FIG. 1 with the busway joint housing sides removed for clarity.

In an embodiment, as illustrated in FIG. 2, the busway section housing 161 includes a busway top cover 121 and a busway bottom cover 122 that cooperate with a pair of opposing busway side covers 127. In the embodiment shown, the busway housing top and bottom covers 121, 122 each comprise a respective busway top and bottom cover transition portion 121a, 122a. The respective busway top and bottom cover transition portions 121a, 122a are configured to cooperate with a housing 163 of a busway joint 113. The busway housing 161 may be formed of rigid non-ferrous material such as aluminum. When operatively installed, busway top cover 121 and busway bottom cover 122 are configured to be fixedly coupled with a respective top and bottom surface 123, 124 of the busway joint 113 (FIG. 4). In various embodiments, the top cover 121 and bottom cover 122 may be fixedly coupled with the respective top and bottom surfaces 123, 124 of the busway joint 113 via any means, such as fastening, riveting strapping, bolting, gluing, and the like that enables the busway system to function as described herein. For example, each busway housing 161, 162 top cover 121 and bottom cover 122 may be fixedly coupled to the respective busway joint top surface 123 and bottom surface 124 with a fastener such as a bolt (not shown). The busway housings 161, 162 are arranged to prevent ingress of dust and contaminants into an interior of the respective busway sections 111, 112 and to operably prevent inadvertent contact with electrically live busbars 116A-116C, 126A-126C by a user. In an embodiment, busway housing 162 may be identical to busway housing 161. Busway housing side covers 127 may be fixedly coupled to the respective busway top cover 121 and bottom cover 122 via any means, such as fastening, riveting strapping, bolting, gluing, and the like that enables the busway system to function as described herein. For example, the busway side covers 127 may be fixedly coupled to the respective busway top cover 121 and bottom cover 122 with a fastener such as a bolt (not shown).

Figure 3:
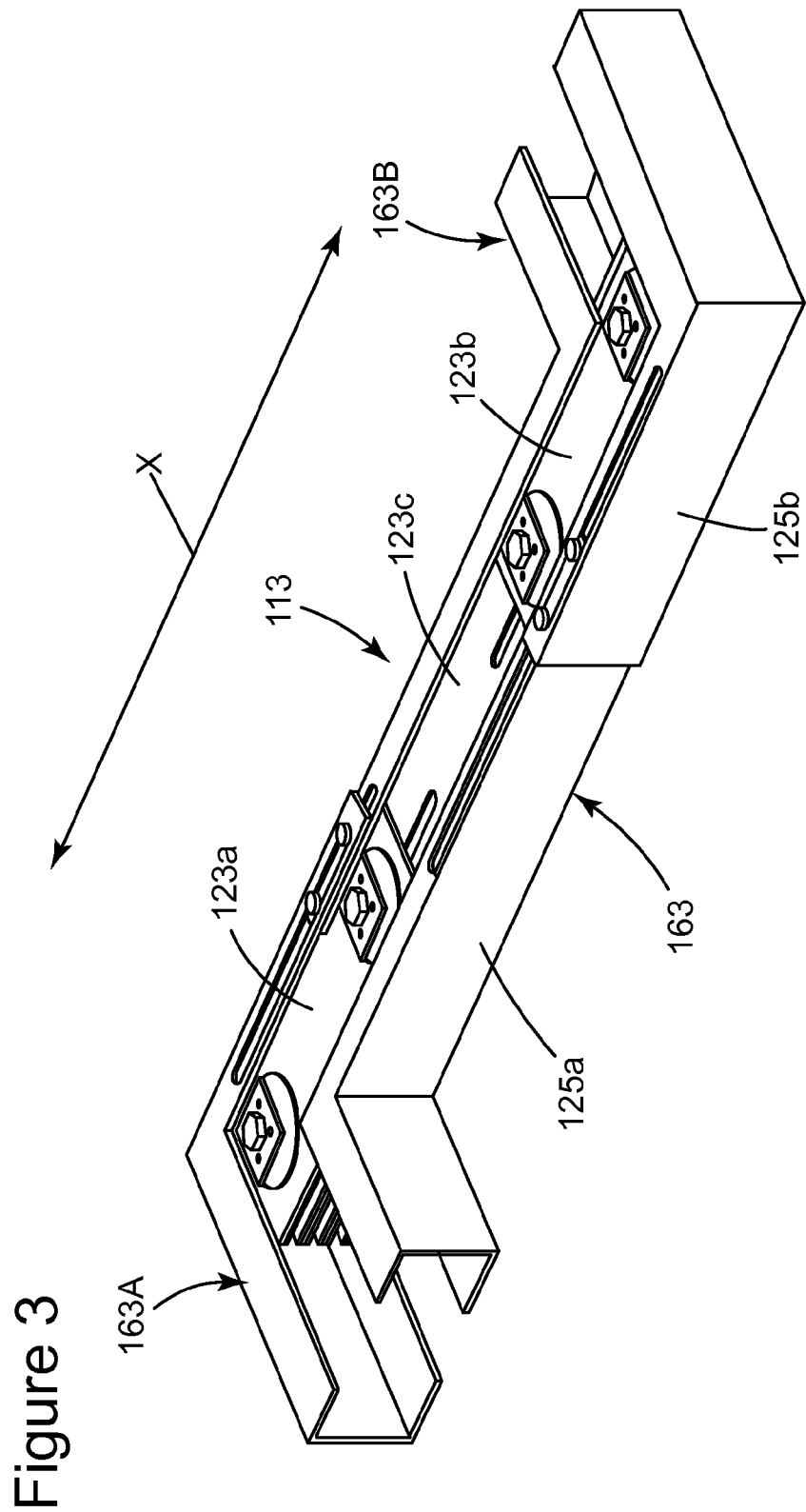
FIG. 3 is a perspective view of a busway joint according to an embodiment.

With reference to FIG. 3 and FIG. 4 an embodiment of the busway joint 113 and busway system 110 are illustrated, and in FIG. 4 portions of the busway joint housing 163 are removed for clarity. A first end 111a of first busway section 111 is operably configured to connect with a first end 113a of the busway joint 113, and a first end 112a of second busway section 112 is configured to operably connect with a second end 113b of busway joint 113. The elongate busway joint is configured to be operably disposed substantially orthogonal to the offset busway sections 111, 112. The separate busway joint 113 is configured to be longitudinally or telescopically adjustable to couple, (for example by clamping together into a pressure type electrical joint) the corresponding bus bar ends in the two successive longitudinally offset busway sections 111, 112. With the busway joint 113 being positioned at one end of each busway section 111, 112, the first busway section 111 and the second busway section 112 are electrically coupleable in an end-to-end relation between an electric power source and a load.

In various embodiments, the adjustable length busway joint 113 comprises a busway joint housing 163. Busway joint housing 163 is arranged to prevent ingress of dust and contaminants into an interior of busway joint 113, and to operably prevent inadvertent contact by a user with the conductors therein. In an embodiment, joint housing 163 is formed of rigid non-ferrous material such as aluminum. As shown in the Figures, the busway joint 113 and joint housing 163 are further arranged and configured for a longitudinal adjustment (i.e., along the direction indicated by the double headed arrow "X"), between a first compressed position and a second extended position.

In an embodiment, housing 163 consists of at least a first housing portion 163a, and a second housing portion 163b, the first and second housing portions 163a, 163b being disposed at opposing ends of housing 163. At least one of the housing portions first and second housing portions 163a, 163b is configured and arranged for movement with respect to the other between a first compressed position and a second extended position to enable a corresponding longitudinal adjustment between a first compressed position and a second extended position of the busway joint 113 length.

In an embodiment, the busway joint first and second housing portions 163a, 163b comprise a respective busway joint housing first and second top surface 123a, 123b disposed generally opposing a respective busway joint housing first and second bottom surface 124a, 124b. In an embodiment, a the busway joint housing comprises a joint housing third top surface 123c, and a busway joint housing third bottom surface 124c. The joint housing third top surface 123c, is disposed between the busway joint housing first and second top surface 123a, 123b, and the joint housing third bottom surface 124c, is disposed between the busway joint housing first and second bottom surface 124a, 124b (FIG. 4). First housing portion 163a further comprises two opposing busway joint first housing portion side surfaces 125a disposed on opposite sides of joint 113 between the housing portion first top surface 123a and housing portion first bottom surface 124a (FIG. 3). Busway joint second housing portion 163b likewise comprises two respective opposing second housing portion side surfaces 125b disposed on opposite sides of joint 113 between housing portion second top surface 123b and housing portion second bottom surface 124b.

In an embodiment, the busway joint housing first, second, and third top and bottom surfaces 123a, 123b, 123c, 124a, 124b, 124c are oriented generally orthogonal to the respective housing portion side surfaces 125a, 125b. The housing portion first and second top surfaces 123a, 123b are arranged and configured to cooperate with the corresponding housing portion third top surface 123c to enable adjustment of the length of busway housing 163. For example, in various embodiments, the housing portion first and second top and bottom surfaces 123a,123b, and 124a,124b and may each overlap at least a respective portion of the housing portion third top surface 123c in both the first compressed and second extended positions of the busway joint 113.

In an embodiment, the busway joint housing first and third top surfaces 123a, 123b, and first and third bottom surfaces 124a, 124c are operably configured for longitudinal movement with respect each other, between a first compressed position and a second extended position. Likewise, in an embodiment, joint housing second and third top surfaces 123b, 123c, and second and third bottom surfaces 124b, 124c are operably configured for longitudinal movement with respect each other, between a third compressed position and a fourth extended position. In an embodiment, each of the first, second, third, and fourth positions of the top and bottom surfaces 123a, 123b, 123c, 124a, 124b, 124c may be associated with one of a first compressed position and second expanded position of the busway joint 113

Figure 5:
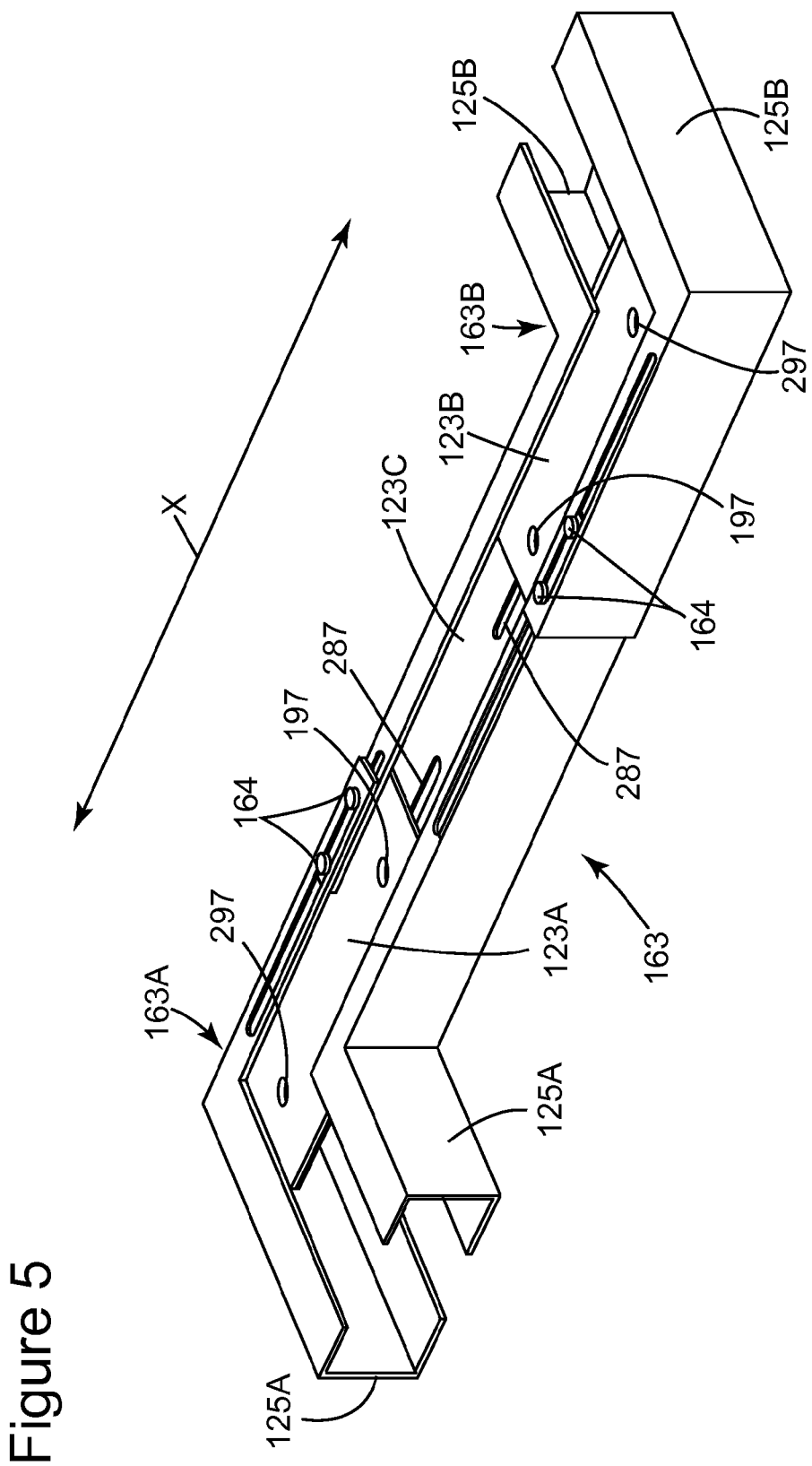
FIG. 5 is perspective view of the housing portion of the busway joint of FIG. 3 with the busway joint according to an exemplary embodiment.
Figure 6:
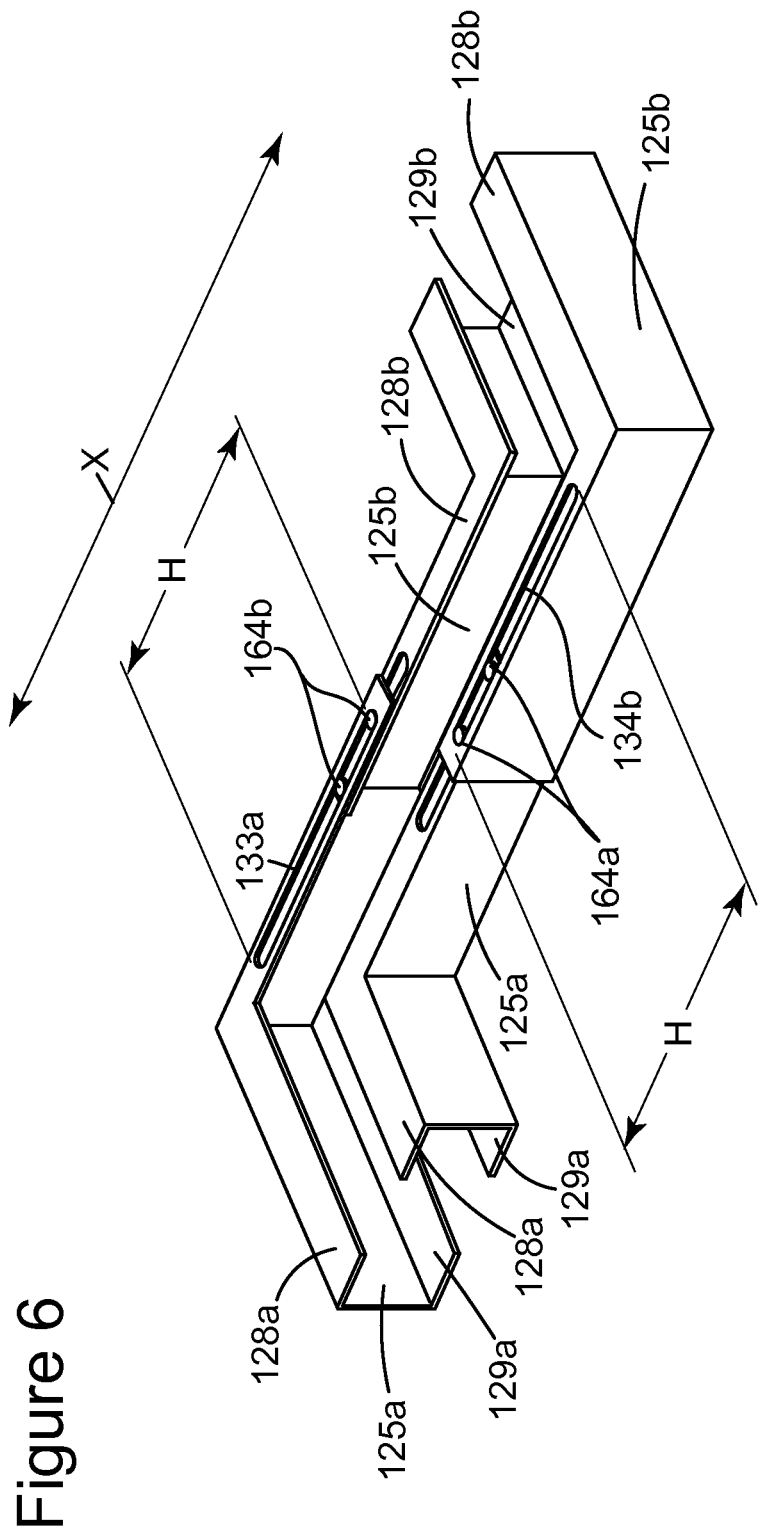
FIG. 6 is a perspective view of an exemplary embodiment of the first and second side surfaces of the housing of the busway joint of FIG. 3 in a first compressed position.
Figure 6A:
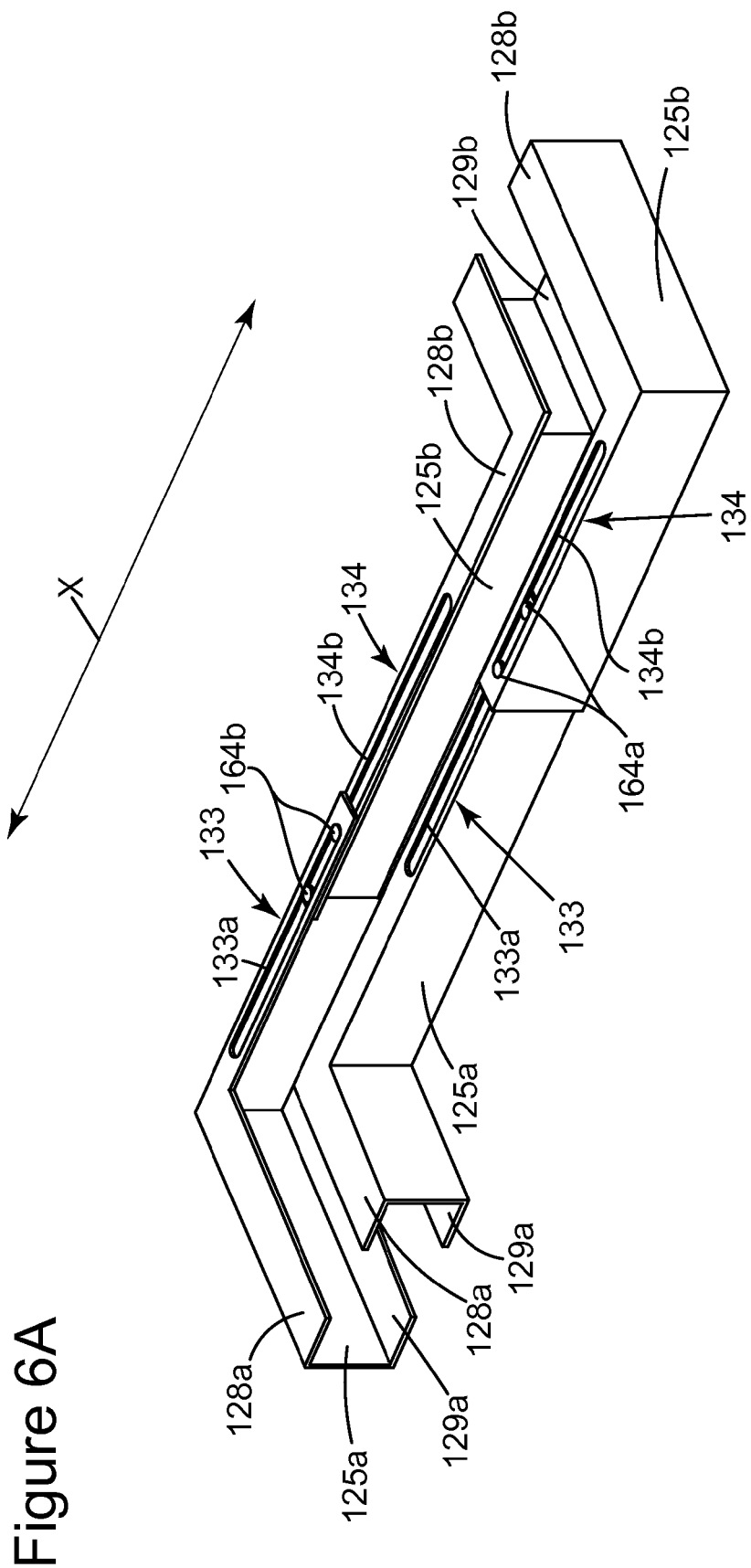
FIG. 6A is a perspective view of an exemplary embodiment of the first and second side surfaces of the housing of the busway joint of FIG. 3 in a second extended position.

Similarly, the first housing portion side surfaces 125a are arranged and configured to cooperate with a respective second housing portion side surface 125b to enable adjustment of the length of busway housing 163. For example, in various embodiments, as shown in FIGS. 5, 6, and 6A, the first housing portion side surfaces 125a overlap at least a portion of the corresponding second housing portion side surface 125b in both the first compressed and second extended positions of the busway joint housing 163. In other embodiments, the respective first and second housing portion side surfaces 125a, 125b may not overlap. In still other embodiments, the respective first and second housing portion side surfaces 125a, 125b may overlap only in the first compressed position of joint housing 163. For example, in an embodiment, when the busway joint 113 is in a first compressed position the respective housing portion side surfaces 125a, 125b may be arranged in an overlapping end-to-end relationship, and when the busway joint housing 163 is adjusted to a second extended position, a gap is defined between the respective housing portion side surfaces 125a, 125b.

While the figures illustrate embodiments of the busway joint housing 163 as comprising two portions 163a and 163b it should be understood that other embodiments are not so limited and housing 163 may comprise any desired number of portions, including any desired number of surfaces that enables busway joint 113 to function as described herein.

Referring again to the embodiment illustrated in FIG. 6 and 6A, each of the busway joint first housing portion side surfaces 125a may comprise a respective first housing portion first tab member 128a, oriented generally orthogonal to the respective side surface 125a; and a first housing portion second tab member 129a, oriented generally opposing the first housing portion first tab member 128a and orthogonal to the respective side surface 125a. Similarly, each of the second housing portion side surfaces 125b comprise a respective second housing portion third tab member 128b, oriented generally orthogonal to the respective second housing portion side surface 125b, and a second housing portion fourth tab member 129b, oriented generally opposing second housing portion second tab member 128b and orthogonal to the respective side surface 125b. Each of first housing portion first tab members 128a is disposed to operably cooperate with a corresponding second housing portion third tab member 128b that is disposed on the opposing end of the same side of joint housing 163. Likewise, each first joint housing portion second tab member 129a is disposed to operably cooperate with a corresponding second housing portion fourth tab member 129b that is disposed on opposing end of the same side of joint housing 163. For example, in an embodiment, each of the first housing portion first tab members 128a is operably disposed to overlap the corresponding second housing portion second tab member 128b disposed on the opposing end of the same side of joint housing 163, and each first housing portion second tab member 129a is disposed to overlap the corresponding second housing portion fourth tab member 129b disposed on opposing end of the same side of joint housing 163.

The busway joint housing first and second housing side surfaces 125a, 125b comprise respective first and second adjustment portions, 133, 134. In an embodiment, the first side surface adjustment portion 133 is disposed on the first housing portion first tab members 128a, and is sized and disposed to cooperate with and overlap at least a portion of a corresponding second side surface adjustment portion 134 disposed on second housing portion second tab member 128b. In other embodiments, the first and second side surface adjustment portions 133, 134 may be disposed on the respective first housing portion second tab members 129a and second housing portion fourth tab member 129b. In still other embodiments, first and second side surface adjustment portions 133, 134 may be disposed on both the respective first housing portion first and second tab members 128a, 129a and second housing portion third and fourth tab member 129a, 129b. In still other embodiments the first and second side surface adjustment portions 133, 134 may be disposed on the first and second side surfaces 125a, 125b.

Figure 6B:
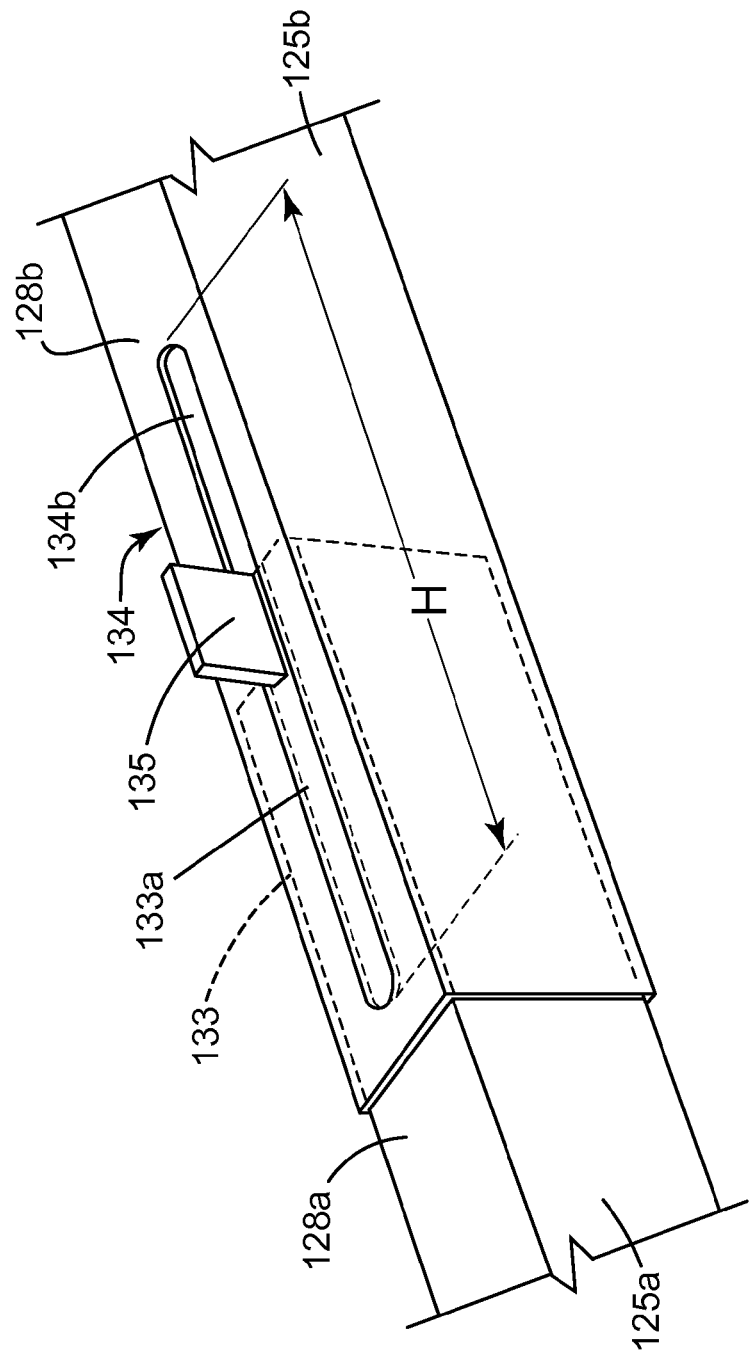
FIG. 6B is a perspective detail view of an exemplary alternative embodiment of the first and second side surface adjustment portions of the housing of the busway joint in a first compressed position.
Figure 6C:
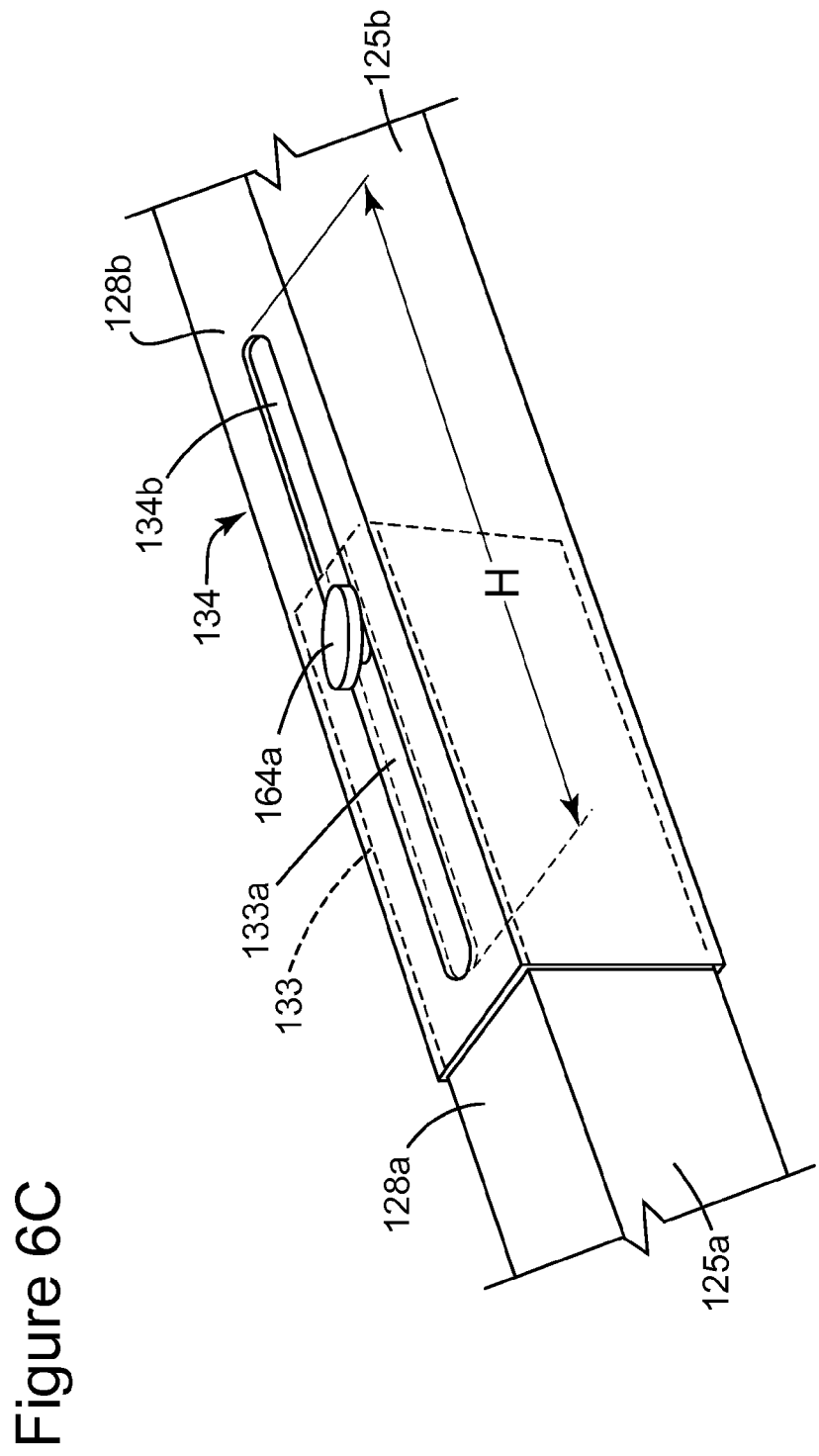
FIG. 6C is a perspective detail view of an exemplary alternative exemplary embodiment of the first and second side surface adjustment portions of the housing of the busway joint in a first compressed position.
Figure 6D:
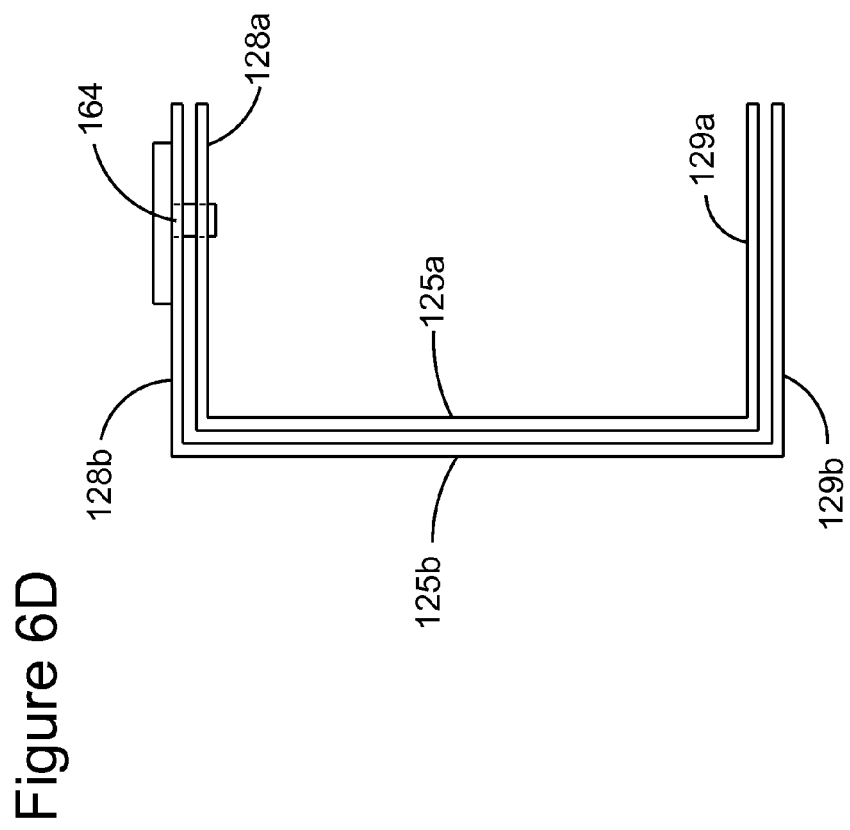
FIG. 6D is a section end view of the alternative exemplary embodiment of FIG. 6C.

For example, in one embodiment, as illustrated in FIGS. 6A, 6B, and 6D, adjustment portion 133 is disposed on each of the two opposing side surfaces 125a. Specifically, in the embodiment, one first tab member 128a includes an adjustment portion 133 comprising a first slot 133a defined therethrough, and the other first tab member 128a includes an adjustment portion 133 comprising at least one first blocking member 164a rigidly coupled to first tab member 128a. Similarly, an adjustment portion 134 is disposed on each of the two opposing side surfaces 125a. Specifically, in this embodiment, one first tab member 128b includes an adjustment portion 134 comprising a second slot 134a defined therethrough, and the other first tab member 128b includes an adjustment portion 134 comprising at least one second blocking member 164b rigidly coupled to corresponding first tab member 128b. The first blocking member 164a is movably disposed in the corresponding adjustment portion second slot 134b, and the second blocking member 164b is movably disposed in the corresponding adjustment portion first slot 133a. By this arrangement, the blocking members 163a, 164a allow each of the first and second housing side surfaces 125a, 125b to slidably move with respect to the other, between a first compressed position and a second extended position to enable a corresponding longitudinal adjustment between a first compressed position and a second extended position of the busway joint 113 length, but also prevent an undesired lateral movement of the housing portions 163a, 163b. Additionally, with this arrangement, while the rigidly attached blocking members 163a, 164a allow the first and second housing side surfaces 125a, 125b to slidably move with respect to the other between a first compressed position and a second extended position, the blocking members 163a, 164a also prevent an undesired movement beyond at least one of the first compressed position and the second extended position.

The first and second side surface adjustment portions 133, 134 at least partially define the distance between the first compressed position and the second extended position of the busway housing 163. For example, in an embodiment having first and second side surface adjustment portions 133, 134 having a longitudinal dimension "H", the distance between the first compressed position and the second extended position of busway housing 163 is less than the longitudinal dimension "H". In an embodiment, as shown in FIG. 6A, each of the adjustment portion first and second slots 133a, 134b have a longitudinal dimension "H" arranged longitudinally along a portion of the first housing portion first tab members 128a.

Figure 6E:
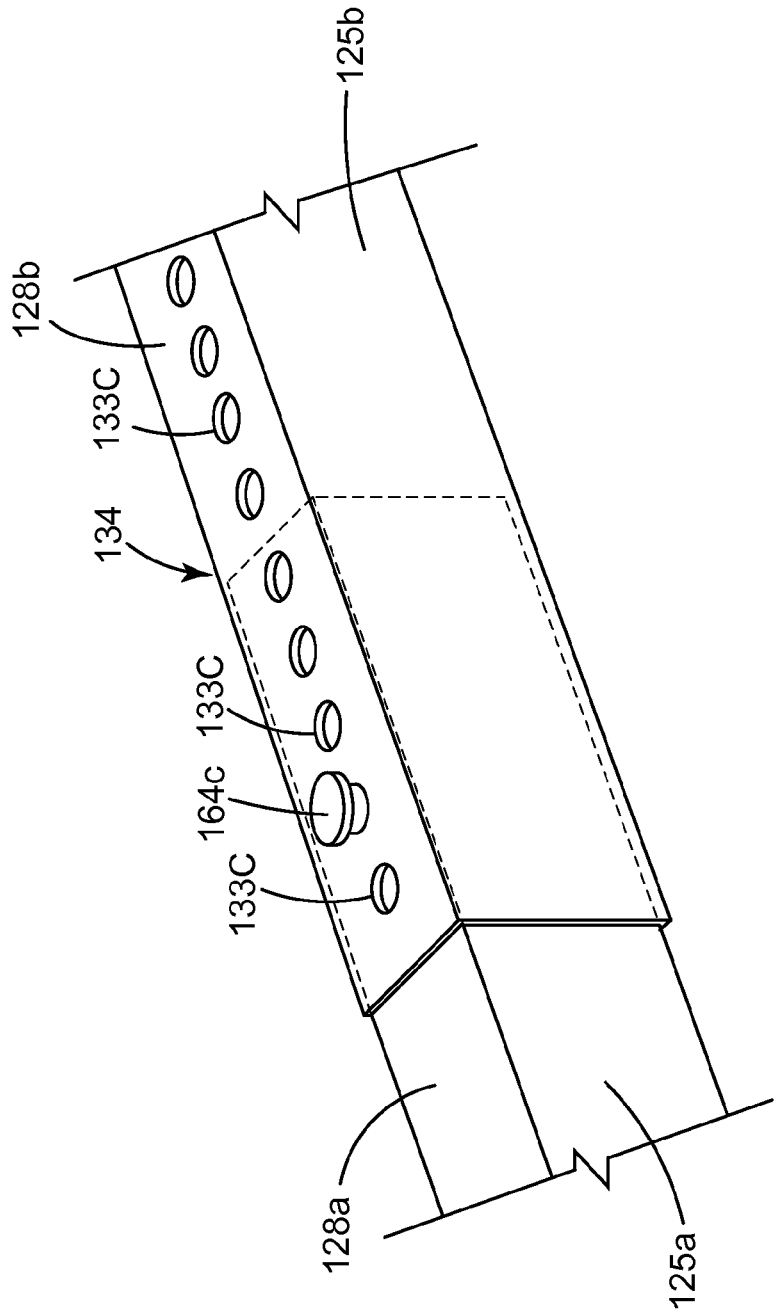
FIG. 6E is a perspective detail view according to an alternative embodiment of the first and second side surface adjustment portions of the housing of the busway joint in a first compressed position.
Figure 7:
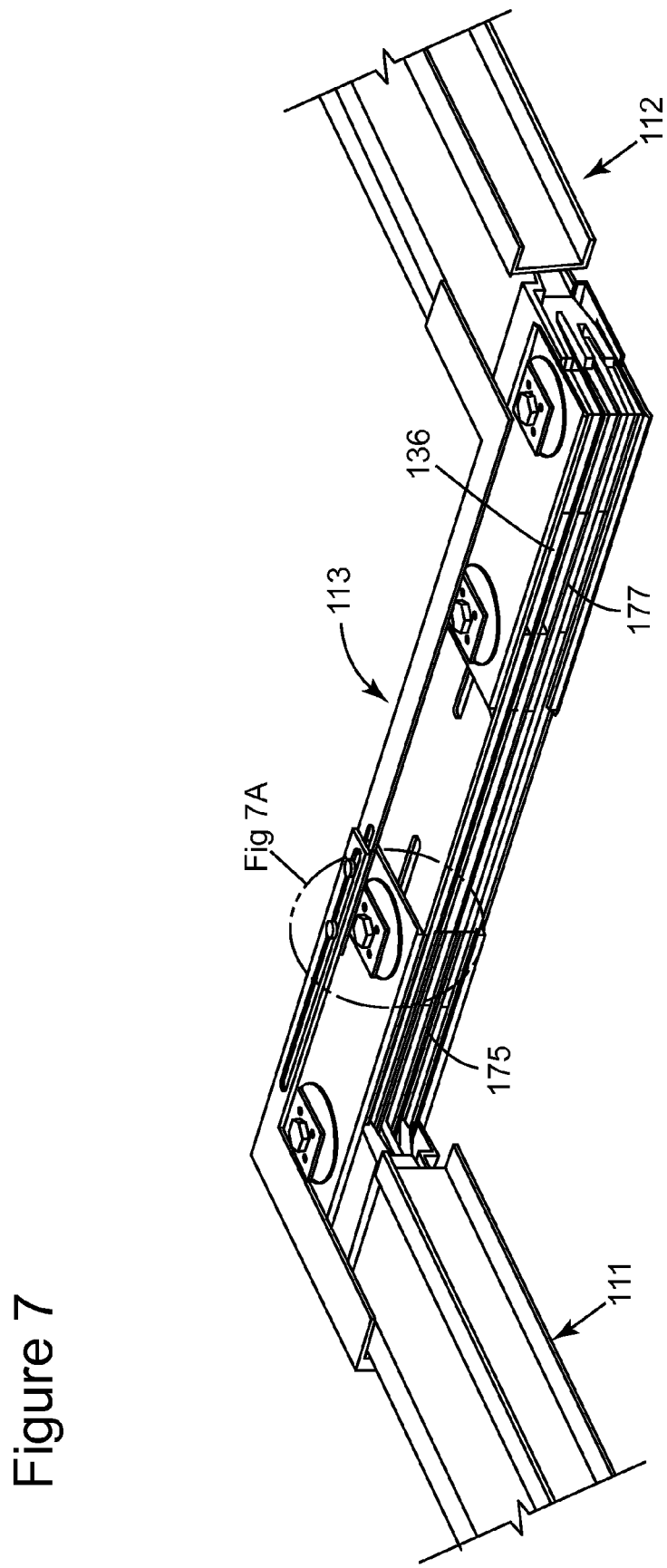
FIG. 7 is a perspective view of a busway system, according to an embodiment, in a first compressed position with one of the busway joint housing sides removed for clarity.
Figure 7A:
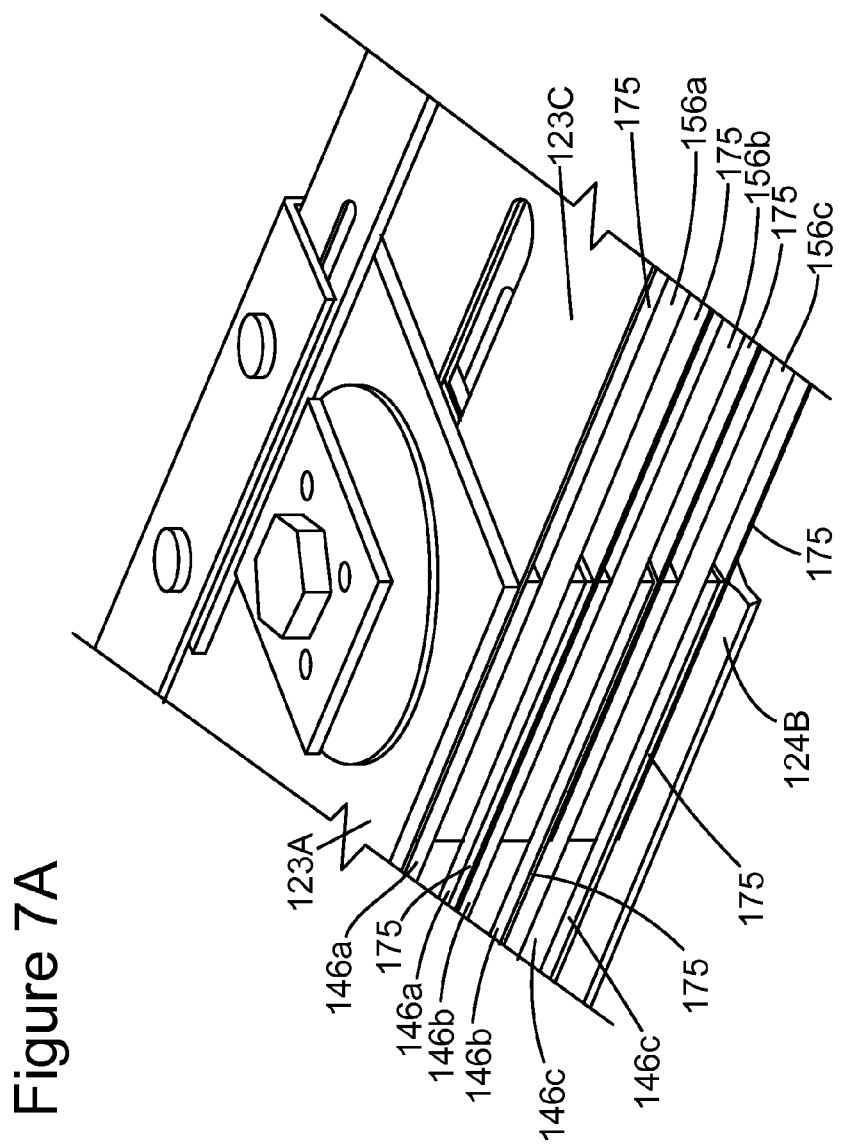
FIG. 7A is a detail view of the busway system of FIG. 7, according to an embodiment, with one of the busway joint housing sides removed for clarity.

In another embodiment, as illustrated in FIGS. 6B and 6C, the second side surface adjustment portions 134 each define a second housing portion aperture 134b arranged longitudinally along a portion of the second housing portion second tab members 129b. In yet another embodiment, as illustrated in FIG. 6E at least one of the first and second side surface adjustment portions 133, 134 define a plurality of apertures 133c distributed longitudinally along the respective first and second tab member 128a, 128b. As shown in FIG. 6E, when the length of housing 163 is adjusted to a desired one of a first compressed position and a second extended position in which at least one of the plurality of apertures 133c on first tab member 128a at least partially aligns with or overlaps one of the plurality of apertures 133c on second tab member 128b, then a blocking member 164, such as for example a pin 164c, is operably disposed in the overlapping apertures 133c. By this arrangement, the relative positions of the first and second housing side surfaces 125a, 125b is fixed and a lateral adjustment of the busway joint 113 length beyond the longitudinal dimension "H" is prevented.

In yet another exemplary embodiment, as shown in FIG. 6B, the first side surface adjustment portion 133 comprises blocking member 164 is formed as a tab member 135 and disposed generally orthogonal to top surface 123. Tab member 135 is configured to be operably disposed in the second housing aperture 134b to retain the relative positions of the first and second housing portions 163a, 163b and prevent a lateral adjustment of the busway joint 113 length beyond the longitudinal dimension "H".

Additionally, in an embodiment, when the busway joint housing 163 is longitudinally adjusted by a user from a first length to a desired second length, to retain the relative positions of the first and second housing portions 163a, 163b and prevent an undesired lateral adjustment of the busway joint 113 length, the busway joint first and second housing portion side surfaces 125a, 125b may be fixedly coupled to the adjacent respective busway section 111, 112 housing side covers 127 via any desired means, such as fastening, riveting strapping, bolting, gluing, and the like that enables the busway system to function as described herein. For example, busway joint first and second housing portion side surfaces 125a, 125b may be fixedly coupled to the respective busway housing side covers 127 top cover 121 and bottom cover 122 with a fastener such as a bolt (not shown).

In various alternative embodiments, the housing 163 may comprise any number of side surfaces 125a, 125b that enables busway joint 113 to function as described herein. For example, in one embodiment housing 163 further comprises at least two opposing third side surfaces 103 (not shown), each third side surface 103 disposed to overlap a first portion of a corresponding one of the first housing portion side surfaces 125a and a second portion of a corresponding one of the second housing portion side surfaces 125b. Each side plate 103 (not shown), may additionally define at least one third housing adjustment portions 139 (not shown), such as aperture 139c (not shown), sized and disposed to operably overlap with at least a portion of at least one of the first and second side surface adjustment portions 133, 134. The third housing adjustment portions 139 (not shown), is configured to at least partially define the distance between the first compressed position and the second extended position of the busway housing 163.

Referring to FIGS. 7 through 10, in an embodiment the busway joint 113 comprises a first splice plate portion 146, a second splice plate portion 136, and a third splice plate portion 156. In other embodiments, it is contemplated that any desired number of splice plate portions, having any desired number of retaining portions and any desired number of adjustment portions, may be used that enable busway joint 113 to function as described herein. Moreover, while the first, second, and third splice plate portions 146, 136, 156 are shown in the figures and discussed herein as each comprising specific numbers of splice plates, it should be understood that other embodiments are not so limited the splice plate portions 146, 136, 156 may each comprise any desired number of splice plates and any desired number of splice plates per electrical phase or neutral, that enables busway system 110 to function as described herein.

The first splice plate portion 146 of the busway joint 113 comprises a first plurality of substantially flat elongate conductive splice plates 146A, 146B, and 146C, disposed in spaced apart substantially parallel relationship and positioned within the housing 163. In an embodiment, each of the first plurality of splice plates 146A-146C is formed of non-ferrous conductive material such as copper or aluminum and disposed generally at a first end 113a of the busway joint 113.

The second splice plate portion 136 of the busway joint 113 comprises a second plurality of substantially flat elongate conductive splice plates 136A, 136B, and 136C, disposed in spaced apart substantially parallel relationship and positioned within the housing 163. In an embodiment, each of the second plurality of splice plates 136A-136C is formed of non-ferrous conductive material such as copper or aluminum and disposed generally at a second end 113b of the busway joint 113.

The third splice plate portion 156 of the busway joint 113 comprises a first plurality of substantially flat elongate conductive splice plates 156A, 156B, and 156C, disposed in spaced apart substantially parallel relationship and positioned within the housing 163. In an embodiment, each of the third plurality of splice plates 156A-156C is formed of non-ferrous conductive material such as copper or aluminum and disposed generally between the first and second splice plate portions 146, 136.

In an embodiment, a first end of each of the first plurality of splice plates 146A-146C is arranged to interleave or overlap with a corresponding one of the bus bars 116A-116C of the first busway section 111 to form a corresponding electrically coupled fixed joint. A second end of each of the first plurality of splice plates 146A-146C is arranged to interleave or overlap with a first end of a corresponding one of the third plurality of splice plates 156A-156C to form a corresponding electrically coupled slidable joint.

In an embodiment, a second end of each of the second plurality of splice plates 136A-136C is arranged to interleave or overlap with a second end of a corresponding one of the third plurality of splice plates 156A-156C to form a corresponding electrically coupled slidable joint. In an embodiment, a second end of each of the second plurality of splice plates 136A-136C is arranged to interleave or overlap with a corresponding one of the bus bars 126A-126C of the second busway section 112 to form a corresponding electrically coupled fixed joint.

In an embodiment, busway system 110 may be arranged to connect to a conventional 3-phase electrical distribution system, and each of the first, second, and third plurality of splice plates 146A-146C, 136A-136C, 156A-156C is arranged and disposed to correspond to a phase or neutral bus within the electrical distribution system. Likewise each fixed and slidable joint disposed in the busway joint 113 and busway system 110 is arranged and disposed to correspond to a phase or neutral bus within the electrical distribution system. In an embodiment, the corresponding splice plates across the busway joint 113 are offset with respect to one another to retain phase centering across the splice plate electrical joint.

Since the splice plates of the first plurality of splice plates 146A-146C, may each be associated with a different electrical phase, the busway joint 113 may additionally comprise a first plurality of non-metallic first insulator plates 175 positioned or interleaved between any of the first plurality of splice plates 146A-146C to electrically insulate any of the first plurality of splice plates 146A-146C associated with one electrical phase from any of the first plurality of splice plates 146A-146C, associated with a different electrical phase.

Since the splice plates of third plurality of splice plates 156A-156C may each be associated with a different electrical phase, the busway joint 113 may additionally comprise a second plurality of non-metallic first insulator plates 175 positioned or interleaved between any of the third plurality of splice plates 156A-156C, to electrically insulate any of the third plurality of splice plates 156A-156C, associated with one electrical phase from any of the third plurality of splice plates 156A-156C associated with a different electrical phase.

Since the second plurality of splice plates 136A-136C may each be associated with a different electrical phase, various embodiments may additionally comprise a second plurality of non-metallic second insulator plates 177 positioned or interleaved between the any of the second plurality of splice plates 136A-136C to electrically insulate any of the second plurality of splice plates 136A-136C associated with one electrical phase from any of the second plurality of splice plates 136A-136C associated with a different electrical phase.

Additionally in an embodiment, to electrically insulate the housing 163 from any of the enclosed splice plates 136A-136C, 146A-146C, 156A-156C therein, the busway joint 113 may comprise one or more non-metallic housing insulator plates 289 (not shown) positioned or interleaved between the housing first and second top surfaces 123a, 123b and any adjacent splice plate of the first, second, and third plurality of splice plates 136A-136C, 146A-146C 156A-156C of any phase; and between the housing first and second bottom surfaces 124a, 124b and any adjacent splice plate of the first and second plurality of splice plates 136A-136C, 146A-146C, 156A-156C of any phase.

Figure 9:
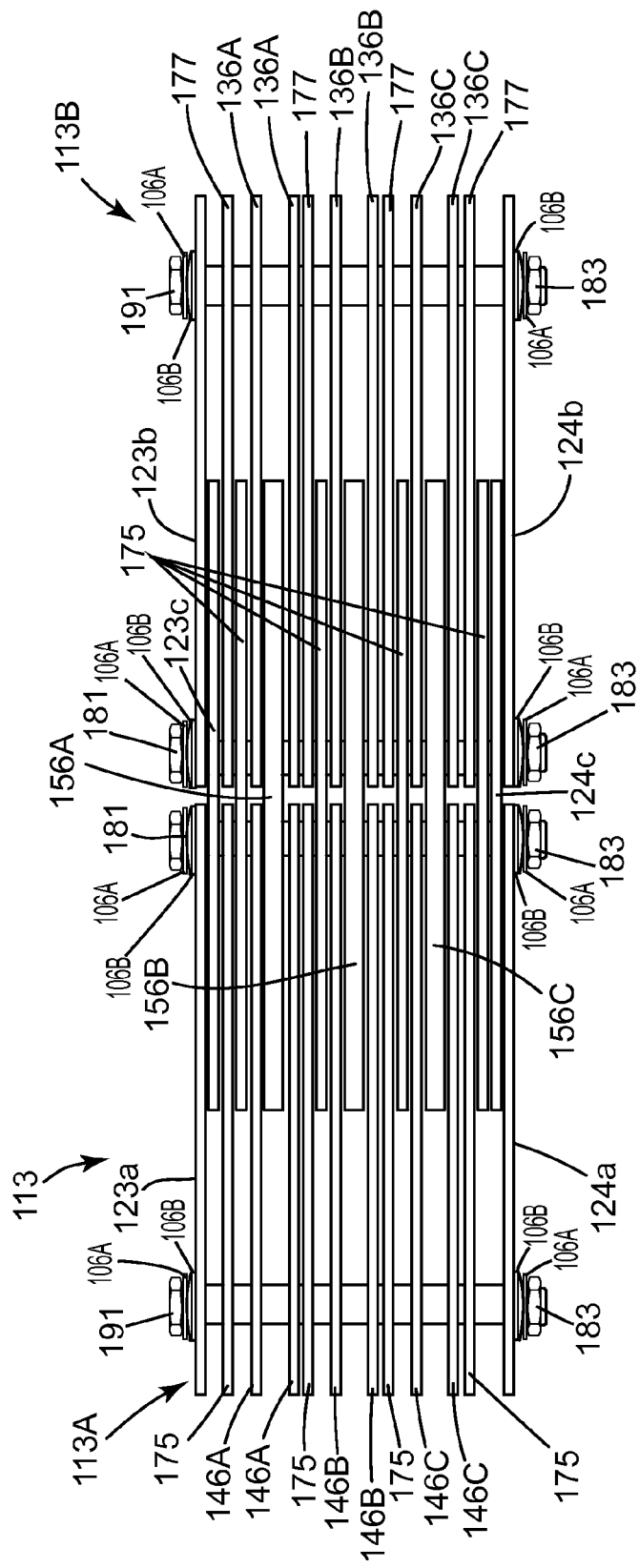
FIG. 9 is a side view of an exemplary busway joint, according to an embodiment, in a first compressed position with the busway joint housing removed for clarity.
Figure 9A:
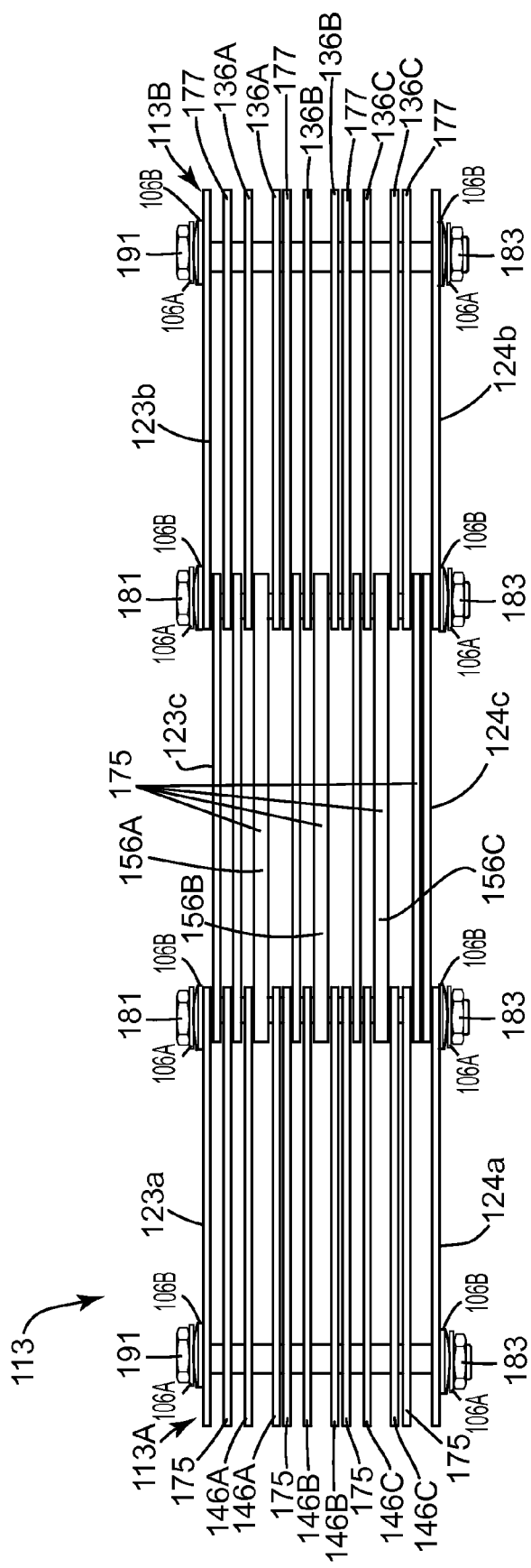
FIG. 9A is a side view of an exemplary busway joint, according to an embodiment, in a second extended position with the busway joint housing removed for clarity.

For example, in one embodiment in FIGS. 9, 9A, an embodiment of a busway joint 113 is shown having a first plurality of splice plates comprising six splice plates 146A-146C, and a second plurality of splice plates comprising three splice plates 136A-136C, and a third plurality of splice plates comprising six splice plates 156A-156C, within housing 163, wherein eight first splice plate insulators 177, and four second splice plate insulators 175 are disposed as described herein. Additionally, in other exemplary embodiments, a housing insulator 389 (not shown) is disposed adjacent the top surfaces 123a, 123b, and a housing insulator 389 (not shown) is disposed adjacent the bottom surfaces 124a, 124b. However it should be understood that other embodiments are not so limited and may comprise any desired number of insulators 175, 177, and 389 that enable busway joint 113 to function as described herein.

In an embodiment, the first and second pluralities of splice plates 146A-146C, 136A-136C are operably configured for longitudinal movement with respect each other, between a first compressed position and a second extended position. Likewise, in an embodiment, the second and third pluralities of splice plates 136A-136C, 156A-156C are operably configured for longitudinal movement with respect each other, between a third compressed position and a fourth extended position. In an embodiment, each of the first, second, third, and fourth positions of the splice plates 146A-146C, 136A-136C, 156A-156C may be associated with one of a first compressed position and second expanded position of the busway joint 113.

Figure 8:
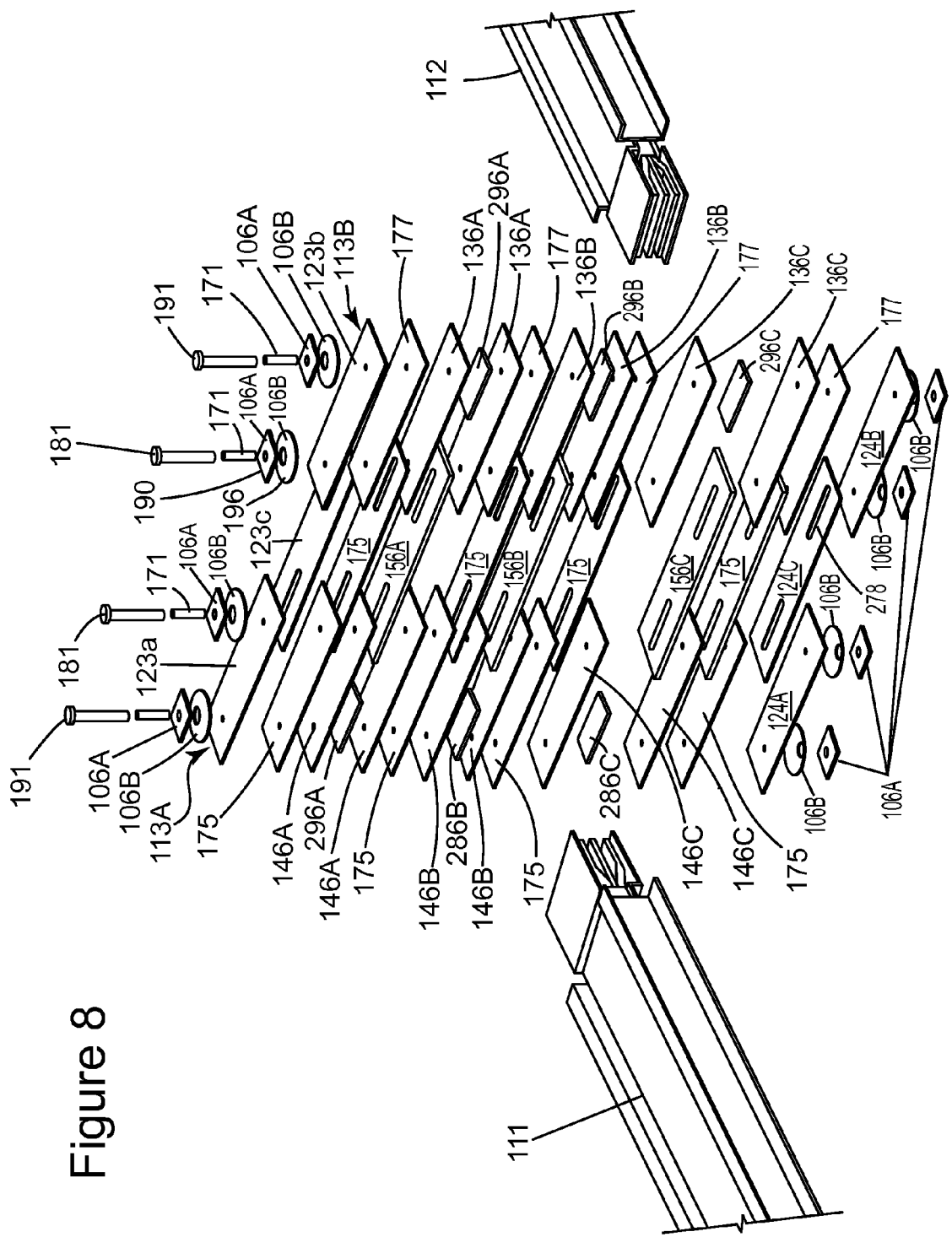
FIG. 8 is an exploded view of the busway system of FIG. 7, according to an embodiment, with the busway joint housing sides removed for clarity

As shown in FIGS. 8-10, the first plurality of splice plates 146A-146C comprises at least one respective first splice plate first retaining portion 147. For example, in an embodiment, the first retaining portion 147 may include a mutually aligned splice plate first retaining aperture 148 defined in each splice plate of the first plurality of splice plates 146A-146C.

As shown in FIGS. 8-10, the third plurality of splice plates 156A-156C comprise at least one respective third splice plate first retaining portion 147. For example, in an embodiment, the third splice plate first retaining portion 147 may include a mutually aligned splice plate first retaining aperture 148 defined in and each splice plate of the third plurality of splice plates 156A-156C.

Additionally, in an embodiment, the first plurality of splice plates 146A-146C comprise at least one respective first splice plate second retaining portion 167. For example, in an embodiment, the first splice plate second retaining portion 167 may include a mutually aligned first splice plate second retaining aperture 168 defined in each splice plate of the first plurality of splice plates 146A-146C.

Additionally, in an embodiment, the third plurality of splice plates 156A-156C each comprise at least one respective third splice plate second retaining portion 167. For example, in an embodiment, the third splice plate second retaining portion 167 may include a mutually aligned third splice plate second retaining aperture 168 defined in each splice plate of the third plurality of splice plates 156A-156C.

In an embodiment, the busway joint housing top and bottom surfaces 123, 124 further each comprise at least one housing surface first retaining portion 197. For example in an embodiment, the busway joint housing first and second top surfaces 123a, 123b each define a respective housing surface first top surface retaining aperture 198, and the busway joint housing first and second bottom surfaces 124a, 124b each define a respective housing portion first bottom surface retaining aperture 198.

Additionally, in an embodiment, the busway joint housing top and bottom surfaces 123, 124 further each comprise at least one housing surface second retaining portion 297. For example in an embodiment, the busway joint housing first and second top surfaces 123a, 123b each define a respective housing surface second top surface retaining aperture 298, and the busway joint housing first and second bottom surfaces 124a, 124b each define a respective housing portion second bottom surface retaining aperture 298.

In an embodiment, the first plurality of non-metallic first insulator plates 175 positioned or interleaved between any of the first plurality of splice plates 146A-146C each comprise at least one respective first insulator plate first retaining portion 176. For example, in an embodiment, the first insulator plate first retaining portion 176 may include a first insulator plate first retaining aperture 186 defined in each non-metallic first insulator plates 175.

In other embodiments, the second plurality of non-metallic first insulator plates 175 positioned or interleaved between any of the third plurality of splice plates 156A-156C, each comprise at least one respective first insulator plate first retaining portion 176. For example, in an embodiment, the first insulator plate first retaining portion 176 may include a first insulator plate first retaining aperture 186 defined in each non-metallic first insulator plates 175.

In an embodiment, the first plurality of non-metallic first insulator plates 175 positioned or interleaved between any of the first plurality of splice plates 146A-146C each comprise at least one respective first insulator plate second retaining portion 276. For example, in an embodiment, the first insulator plate second retaining portion 276 may include a first insulator plate second retaining aperture 286 defined in each non-metallic first insulator plates 175.

In an embodiment, the second plurality of non-metallic first insulator plates 175 positioned or interleaved between any of the third plurality of splice plates 156A-156C each comprise at least one respective first insulator plate second retaining portion 276. For example, in an embodiment, the first insulator plate second retaining portion 276 may include a first insulator plate second retaining aperture 286 defined in each non-metallic first insulator plates 175.

The second plurality of splice plates 136A-136C define a splice plate first adjustment portion 137, having a first operative longitudinal dimension "D". For example in an embodiment, the first adjustment portion 137 may include a mutually aligned and longitudinally disposed splice plate first adjustment slot 138 defined each splice plate of the second plurality of splice plates 136A-136C. In an embodiment, the splice plate first adjustment portion 137 may alternatively comprise a plurality of mutually aligned longitudinally disposed splice plate adjustment apertures (not shown) disposed along corresponding splice plates of the second plurality of splice plates 136A-136C.

In an embodiment, the second plurality of splice plates 136A-136C further define a second splice plate second adjustment portion 237, having a second longitudinal dimension "S", such as a mutually aligned and longitudinally disposed splice plate second adjustment slot 238 defined in each splice plate of the second plurality of splice plates 136A-136C. In another embodiment, the second splice plate second adjustment portion 237 comprises a plurality of longitudinally disposed and mutually aligned second splice plate second adjustment apertures (not shown) disposed on corresponding splice plates of the second plurality of splice plates 136A-136C.

Additionally, in an embodiment, the busway joint housing third top surface, and third bottom surface 123c, 124c, each define a respective joint housing third top and third bottom surface first adjustment portion 287. For example in an embodiment, the respective third top and third bottom first adjustment portion 287 may include a longitudinally disposed third top and third bottom surface 123c, 124c first adjustment slot 288 defined each third top surface 123c, and third bottom surface 124c, and having a first operative longitudinal dimension at least equal to the second splice plate first adjustment portion 137 operative longitudinal dimension "D".

Additionally, in an embodiment, the busway joint housing third top surface, and third bottom surface 123c, 124c, each define a respective joint housing third top and third bottom second adjustment portion 387. For example in an embodiment, the respective third top and third bottom surface second adjustment portions 387 may include a longitudinally disposed top and bottom third surface 123c, 124c second adjustment slot 388 defined each third top surface, and third bottom surface 123c, 124c and having a first operative longitudinal dimension at least equal to the second splice plate second adjustment portion 137 operative longitudinal dimension "S".

In an embodiment, the second insulator plates 177 positioned or interleaved between the any of the second plurality of splice plates 136A-136C, each comprise at least one respective second insulator plate first adjustment portion 178. In an embodiment, the second insulator plate first adjustment portion 178 may include a mutually aligned and longitudinally second insulator plate first adjustment slot 179 defined each second insulator plate 177. In an embodiment, the second insulator plate first adjustment portion 178 may alternatively comprise a plurality of mutually aligned longitudinally disposed splice plate adjustment apertures (not shown) disposed along corresponding insulator plates 177.

In an embodiment, the second insulator plates 177 positioned or interleaved between the any of the second plurality of splice plates 136A-136C, each comprise at least one respective second insulator plate second adjustment portion 278. In an embodiment, the second insulator plate first adjustment portion 278 may include a mutually aligned and longitudinally second insulator plate first adjustment slot 279 defined each second insulator plate 177. In an embodiment, the second insulator plate first adjustment portion 178 may alternatively comprise a plurality of mutually aligned longitudinally disposed splice plate adjustment apertures (not shown) disposed along corresponding insulator plates 177.

The first adjustment portion 137 of each splice plate of the second plurality of splice plates 136A-136C is sized and disposed to operatively overlap the corresponding joint housing first top surface 123a first retaining portion 197, third top surface 123c first adjustment portion 287, the third bottom surface 124c first adjustment portion 287, the first bottom surface 124a first retaining portion 197, the first plurality of splice plates 146A-146C first retaining portion 147, first insulator plate 175 first retaining portion 176, and the second insulator plate 177 first adjustment portion 178.

Similarly, the second adjustment portion 237 of each splice plate of the second plurality of splice plates 136A-136C is disposed to operatively overlap the corresponding joint housing second top surface 123b first retaining portion 197, the joint housing third top surface 123c second retaining portion 387, the second bottom surface 124b first retaining portion 197, the joint housing third bottom surface 124b second adjustment portion 387, and the third plurality of splice plates 156A-156C first retaining portion 147, the first insulator plate first retaining portions 176, and the second insulator plate 177 second adjustment portions 278.

Referring to FIG. 8, the busway joint 113 also comprises at least one first positioning guide member 181 respectively disposed in the overlapped corresponding first adjustment portion 137 of each splice plate of the second plurality of splice plates 136A-136C, joint housing first top surface 123a first retaining portion 197, third top surface 123c first adjustment portion 287, the third bottom surface 124c first adjustment portion 287, the first bottom surface 124a first retaining portion 197, the first plurality of splice plates 146A-146C first retaining portion 147, first insulator plate 175 first retaining portion 176, and the second insulator plate 177 first adjustment portion 178.

Similarly, the busway joint 113 also comprises at least one second positioning guide member 181 respectively disposed in the overlapped corresponding second adjustment portion 237 of each splice plate of the second plurality of splice plates 136A-136C, the joint housing second top surface 123b first retaining portion 197, the joint housing third top surface 123c second retaining portion 387, the second bottom surface 124b first retaining portion 197, the joint housing third bottom surface 124b second adjustment portion 387, and the third plurality of splice plates 156A-156C first retaining portion 147, the first insulator plate first retaining portions 176, and the second insulator plate 177 second adjustment portions 278.

The first and second positioning guide members 181 are operative to guide the respective positioning of the first, second and third pluralities of splice plates 146A-146C, 136A-

136C, 156A-156C first and second insulator plates 175, 177, and respective housing first, second, and third top and bottom surfaces 123*a*, 123*b*, 123*c*, 124*a*, 124*b*, 124*c*. The first and second positioning guide members 181 may additionally operatively clamp or fixedly retain the respective relative positions of the first, second, and third pluralities of splice plates 146A-146C, 136A-136C, 156A-156C, first and second insulator plates 175, 177, and respective housing first, second, and third top and bottom surfaces 123*a*, 123*b*, 123*c*, 124*a*, 124*b*, 124*c* in a desired overlapped position.

In an embodiment, first and second positioning guide members 181 are operative to releasably prevent an undesired lateral adjustment of the busway joint 113 length and to vary the pressure exerted to permit selective connecting and disconnecting of the electrical joint. For example in one embodiment, first and second positioning guide members 181 are threaded bolts configured to cooperate with a respective pressure member 106, such as at least one respective pressure plate or disc spring washer configured to be rotatably mounted to first and second positioning guide member 181, and a respective nut 183 arranged for threadable engagement with first and second positioning guide member 181. In an embodiment, the pressure member 106 comprises a rectangular washer 106A and a spring washer 106B. In other embodiments, rectangular washer 106A may be threaded. For example, the busway joint 113 top surface 123 and bottom surface 124 are fastened to each other and to the busway joint 113 by first and second positioning guide members 181, rectangular washers 106A, and spring washers 106B.

In various embodiments, the at least one first positioning guide member 181 is formed of a conductive material, such as steel, and a non-metallic insulating tube 171 is additionally disposed within the respective splice plate, insulator plate, and housing first retaining portions, and splice plate, insulator plate, and housing adjustment portions, and sized and disposed to receive the first positioning guide member 181, and operative to electrically insulate any of the first, second, and third plurality of splice plates 146A-146C, 136A-136C, 156A-156C from the first positioning guide member 181.

In one embodiment, the longitudinally disposed splice plate adjustment portions 137, 237, insulator adjustment portions 177, and housing adjustment portions 287, 267 cooperate with the first and second positioning guide members 181 to at least partially determine the operable distance between the first compressed position and the second extended position. For example, in an embodiment having a splice plate first adjustment portion 137 having a first longitudinal dimension "D", and a splice plate second adjustment portion 137 having a longitudinal dimension "S", the distance between the first compressed position and the second extended position of busway joint 113 may be equal to or less than the sum of the first and second longitudinal dimension "D+S". In another embodiment, the operative position of the first positioning guide member 181 within each splice plate adjustment slot 138, at least partially determines the length, or distance between the first compressed position and the second extended position of busway joint 113.

In an embodiment, the first plurality of splice plates 146A-146C second retaining portion 167 is disposed to operatively align with or overlap the corresponding joint housing first top surface 123*a* second retaining portion 297, the first bottom surface 124*a* second retaining portion 297, and the first insulator plate 175 second retaining portion 176.

In an embodiment, the third plurality of splice plates 156A-156C second retaining portion 167 is disposed to operatively align with or overlap the corresponding joint housing second top surface 123*b* second retaining portion 297, the second bottom surface 124*b* second retaining portion 297, and the first insulator plate 175 second retaining portion 276.

In an embodiment, each busway joint 113 may also comprise at least one first clamp member 191 respectively disposed in the aligned corresponding second retaining portion 167 of the first plurality of splice plates 146A-146C, the joint housing first top surface 123*a* second retaining portion 297, the first bottom surface 124*a* second retaining portion 297, and the first insulator plate 175 second retaining portion 176. The first clamp member 191 operatively clamps or fixedly retains the relative positions of the respective first plurality of splice plates 146A-146C, the joint housing first top surface 123*a*, the joint housing first bottom surface 124*a*, and the first insulator plates 175. In various embodiments, at least one first clamp member 191 is operative to selectively connect and disconnect at least one of busbars 116A-116C of the first busway section 111 and the first plurality of splice plates 146A-146C in a pressure type electrical joint. First clamp member 191 is operative to vary the pressure exerted to permit selective connecting and disconnecting of the electrical joint.

In an embodiment, each busway joint 113 may also comprise at least one second clamp member 191 respectively disposed in the overlapped second retaining portion 167 of the third plurality of splice plates 156A-156C, the joint housing second top surface 123*b* second retaining portion 297, the second bottom surface 124*b* second retaining portion 297, and the first insulator plate 175 second retaining portion 276. The second clamp member 191 operatively clamps or fixedly retains the relative positions of the respective third plurality of splice plates 156A-156C, the joint housing second top surface 123*b*, the joint housing second bottom surface 124*b*, and the first insulator plates 175. In various embodiments, at least one second clamp member 191 is operative to selectively connect and disconnect at least one of busbars 126A-126C of the second busway section 112 and the third plurality of splice plates 156A-156C in a pressure type electrical joint. Second clamp member 191 is operative to vary the pressure exerted to permit selective connecting and disconnecting of the electrical joint.

In an embodiment, the first and second clamp members 191 may be identical to first positioning guide member 181. In various embodiments, the first and second clamp members 191 are formed of a conductive material, such as steel, and a non-metallic insulating tube 171, sized and disposed to receive at least one of the first and second the clamp members 191, is additionally disposed in the splice plate, insulator plate, and housing second retaining portions, and is operative to electrically insulate any of the first and third plurality of splice plates 146A-146C, 156A-156C from the first and second clamp members 191.

For example in one embodiment, first and second clamp members 191 are threaded bolts configured to cooperate with a respective pressure member 106, such as at least one respective pressure plate or disc spring washer configured to be rotatably mounted to first and second clamp member 191, and a respective nut 183 arranged for threadable engagement with first and second clamp member 191. In an embodiment, the pressure member 106 comprises a rectangular washer 106A and a spring washer 106B. In other embodiments, rectangular washer 106A may be threaded. For example, the busway joint 113 top surface 123 and bottom surface 124 are fastened to each other and to the busway joint 113 by first and second clamp members 191, rectangular washers 106A, and spring washers 106B.

In some embodiments, a first plurality of substantially flat splice plate shim members 196A, 196B, 196C is disposed in spaced apart substantially parallel relationship at the first end of busway joint 113. The shim members 196A-196C are respectively arranged to interleave with the first end of a corresponding one of the first plurality of splice plates 146A-146C, and further operatively disposed opposing a corresponding one of the bus bars 116A-116C of the first busway section 111. The shim members 196A, 196B, 196C are operative to maintain the spacing between the splice plates of the first plurality of splice plates 146A-146C when the first clamp member is operatively tightened. In some embodiments, the splice plate shim members 196A, 196B, 196C are formed of conductive material such as copper or aluminum. Other embodiments are not so limited and the splice plate shim members 196A, 196B, 196C may be formed of any desired material that enables the busway joint 113 to function as described herein.

In some embodiments, a second plurality of substantially flat splice plate shim members 296A, 296B, 296C is disposed in spaced apart substantially parallel relationship at the second end of busway joint 113. The shim members 296A-296C are respectively arranged to interleave with the first end of a corresponding one of the third plurality of splice plates 156A-156C, and further operatively disposed opposing a corresponding one of the bus bars 126A-126C of the first busway section 112. The shim members 296A, 296B, 296C are operative to maintain the spacing between the splice plates of the third plurality of splice plates 156A-156C when the first clamp member is operatively tightened. In some embodiments, the splice plate shim members 296A, 296B, 296C are formed of conductive material such as copper or aluminum. Other embodiments are not so limited and the splice plate shim members 296A, 296B, 296C may be formed of any desired material that enables the busway joint 113 to function as described herein.

In operation, and to effect easy installation of the busway system, the busway joint 113 is first compressed by moving the busway joint 113 longitudinally. For example by loosening each position guide member 181 and clamp member 191 the busway joint 113 may be telescoped from the second extended position to the first compressed position to shorten the busway joint 113 length. When both busway sections 111, 112 are offset in end-to-end relation for establishing an electrical joint therebetween, and the busway joint 113 is recessed in the first compressed position, transverse movement relative to busway section 111 in a plane parallel with the planes of the busbars of the first and second busway sections 111, 112 is permitted. In an embodiment, the second busway section 112 is mated with the busway joint 113 so that the ends of corresponding busbars 126A-126C and third plurality of splice plates 156A-156C are interleaved or overlapped into respective electrically coupled joints and the corresponding clamp member 191 tightened. The busway joint 113 may then be longitudinally extended in the reverse direction, that is, extended by a user from the first compressed position to the second extended position toward the first busway section 111 so that the ends of corresponding busbars 116A-116C, and first plurality of splice plates 146A-146C are interleaved or overlapped into respective electrically coupled joints and at least one of the corresponding clamp member 191 and the position guide member 181 tightened to establish the electrical joint between the two successive busway sections 111, 112.

While the Figures generally illustrate three busbars in each of the busway sections, it should be understood that other embodiments are not so limited and may comprise any desired number of busbars and may be configured to connect with any number of electrical phases.

In various embodiments, it is contemplated that any desired number of splice plate portions, having any desired number of retaining portions and any desired number of adjustment portions, may be used that enable busway joint 113 to function as described herein. Moreover, while first, second, and third splice plate portions 146, 136, 156 are shown in the figures and discussed herein as each comprising six splice plates, it should be understood that other embodiments are not so limited and the any desired number of splice plate portions 146, 136, 156 may each comprise any desired number of splice plates and any desired number of splice plates per electrical phase or neutral, that enables busway system 110 to function as described herein.

Exemplary embodiments of a busway joint, a busway system, and a method of installing a busway joint are described above in detail. The busway joint, a busway system, and a method of installing a busway joint are not limited to the specific embodiments described herein, but rather, components of the system and/or busway joint and/or steps of the method may be utilized independently and separately from other components and/or steps described herein. For example, the busway joint may also be used in combination with other busway systems and methods, and is not limited to practice with only the busway as described herein. Rather, the exemplary embodiment can be implemented and utilized in connection with many other electrical applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A busway joint for coupling a first and a second busway section, the first and second busway sections being longitudinally offset, the busway joint comprising:

a first plurality of electrically conductive splice plates disposed in spaced apart substantially parallel relationship, each splice plate of said first plurality of splice plates defining a first splice plate first retaining portion;

a second plurality of electrically conductive splice plates disposed in spaced apart substantially parallel relationship, each splice plate of said second plurality of splice plates disposed to overlap a portion of a corresponding splice plate of said first plurality of splice plates to form an electrical joint, each splice plate of said second plurality of splice plates defining a splice plate first adjustment portion substantially longitudinally aligned with said first plurality of splice plates and operably disposed to overlap a portion of a corresponding said first splice plate first retaining portion;

at least one first positioning member sized and configured to be operably disposed in said first splice plate first retaining portion and said second splice plate first adjustment portion;

said first and said second pluralities of splice plates being arranged for a longitudinal movement with respect each other between a first compressed position and a second extended position;

a third plurality of electrically conductive splice plates, disposed in spaced apart substantially parallel relationship, each splice plate of the said third plurality of splice plates defining a third splice plate first retaining portion;

each said splice plate of said second plurality of electrically conductive splice plates further disposed to overlap a portion of a corresponding splice plate of said third plurality of splice plates to form an electrical joint, each splice plate of said second plurality of splice plates defining a splice plate second adjustment portion substantially longitudinally aligned with said third plurality of splice plates and operably disposed to overlap a portion of a corresponding said third splice plate first retaining portion; and at least one second positioning member configured to be operably disposed in said splice plate second adjustment portion and said third splice plate first retaining portion;

said third and said second pluralities of splice plates being arranged for a longitudinal movement with respect each other between a third compressed position and a fourth extended position.

2. The busway joint of claim 1 further comprising at least one first clamping member, wherein:

each splice plate of said first plurality of splice plates further defines a first splice plate second retaining portion; and said at least one first clamping member is configured to be operably disposed in said first splice plate second retaining portion.

3. The busway joint of claim 2 further comprising at east one second clamping member; wherein each said splice plate of the third plurality of splice plates further defines a third splice plate second retaining portion; and said at least one second clamping member is configured to be operably disposed in said first splice plate second retaining portion.

4. The busway joint of claim 1 further comprising: a first plurality of splice plate shims configured to be operably disposed at a first end of said busway joint and arranged to interleave therebetween a corresponding one of said first plurality of splice plates, and disposed opposing a corresponding one of the bus bars of the first busway section operative to maintain a spacing between the splice plates of the first plurality of splice plates.

5. The busway joint of claim 4 further comprising a second plurality of splice plate shims configured to be operably disposed at a second end of said busway joint and arranged to interleave therebetween a corresponding one of said second plurality of splice plates, and disposed opposing a corresponding one of the bus bars of the second busway section operative to maintain a spacing between the splice plates of the first plurality of splice plates.

6. The busway joint of claim 1, further comprising a first plurality of insulators, at least one insulator of said plurality of insulators disposed therebetween each splice plate of said first plurality of splice plates to insulate each splice plate of said first plurality of splice plates from each other.

7. The busway joint of claim 1, further comprising a second plurality of insulators, at least one insulator of said plurality of insulators disposed therebetween each splice plate of said second plurality of splice plates to insulate each splice plate of said second plurality of splice plates from each other.

8. The busway joint of claim 1, further comprising a third plurality of insulators, at least one insulator of said third plurality of insulators disposed therebetween at least one splice plate of said third plurality of splice plates to insulate said at least one splice plate of said third plurality of splice plates from each other.

9. The busway joint of claim 1, wherein each wherein each splice plate of said first plurality of splice plates, and each said corresponding splice plate of said second plurality of splice plates, and each said corresponding splice plate of said third plurality of splice plates is associated with one of a distinct electrical phase, ground, or neutral.

10. The busway joint of claim 1, further comprising:

a housing comprising a first housing portion, and a second housing portion, at least one of said first and said second housing portions configured and arranged for a longitudinal movement with respect each other, between a first compressed position and a second extended position;

said first, second, and third plurality of splice plates being at least partially disposed within said housing.

11. The busway joint of claim 8, wherein a portion of said first housing portion is arranged and disposed to overlap at least a portion of said second housing portion.

12. A busway system, comprising:

a first electrical busway section;

a second electrical busway section, said first and said second busway sections being configured to be electrically coupled and disposed longitudinally offset from each other;

a busway joint disposed between and operative to couple said first and said second electrical busway sections, the busway joint comprising a first plurality of electrically conductive splice plates disposed in spaced apart substantially parallel relationship, each splice plate of said first plurality of splice plates defining a first splice plate first retaining portion;

a second plurality of electrically conductive splice plates disposed in spaced apart substantially parallel relationship, each splice plate of said second plurality of splice plates disposed to overlap a portion of a corresponding splice plate of said first plurality of splice plates to form an electrical joint, each splice plate of said second plurality of splice plates defining a splice plate first adjustment portion substantially longitudinally aligned with said first plurality of splice plates and operably disposed to overlap a portion of a corresponding said first splice plate first retaining portion;

at least one first positioning member sized and configured to be operably disposed in said first splice plate first retaining portion and said second splice plate first adjustment portion;

said first and said second pluralities of splice plates being arranged for a longitudinal movement with respect each other between a first compressed position and a second extended position;

a third plurality of electrically conductive splice plates, disposed in spaced apart substantially parallel relationship, each splice plate of the said third plurality of splice plates defining a third splice plate first retaining portion;

each said splice plate of said second plurality of electrically conductive splice plates further disposed to overlap a portion of a corresponding splice plate of said third plurality of splice plates to form an electrical joint, each splice plate of said second plurality of splice plates defining a splice plate second adjustment portion substantially longitudinally aligned with said third plurality of splice plates and operably disposed to overlap a portion of a corresponding said third splice plate first retaining portion; and at least one second positioning member configured to be operably disposed in said splice plate second adjustment portion and said third splice plate first retaining portion;

said third and said second pluralities of splice plates being arranged for a longitudinal movement with respect each other between a third compressed position and a fourth extended position.

13. The busway system of claim 12 wherein said busway joint further comprises: at least one first clamping member;

each splice plate of said first plurality of splice plates further defines a first splice plate second retaining portion; and said at least one first clamping member is configured to be operably disposed in said first splice plate second retaining portion.

14. The busway system of claim 13, wherein said busway joint further comprises: at least one second clamping member;

each said splice plate of the third plurality of splice plates further defines a third splice plate second retaining portion; and said at least one second clamping member is configured to be operably disposed in said third splice plate second retaining portion.

15. The busway system of claim 12, wherein said busway joint further comprises: a first plurality of splice plate shims configured to be operably disposed at a first end of said busway joint and arranged to interleave therebetween a corresponding one of said first plurality of splice plates, and disposed opposing a corresponding one of the bus bars of the first busway section operative to maintain a spacing between the splice plates of the first plurality of splice plates.

16. The busway system of claim 15 wherein said busway joint further comprises: a second plurality of splice plate shims configured to be operably disposed at a second end of the busway joint and arranged to interleave therebetween a corresponding one of said second plurality of splice plates, and disposed opposing a corresponding one of the bus bars of the second busway section operative to maintain a spacing between the splice plates of the first plurality of splice plates.

17. The busway system of claim 12, wherein said busway joint further comprises: a first plurality of insulators, at least one insulator of said plurality of insulators disposed therebetween each splice plate of said first plurality of splice plates to insulate each splice plate of said first plurality of splice plates from each other.

18. The busway system of claim 12, wherein said busway joint further comprises: a second plurality of insulators, at least one insulator of said plurality of insulators disposed therebetween each splice plate of said second plurality of splice plates to insulate each splice plate of said second plurality of splice plates from each other.

19. The busway system of claim 12, wherein said busway joint further comprises: a third plurality of insulators, at least one insulator of said third plurality of insulators disposed therebetween at least one splice plate of said third plurality of splice plates to insulate said at least one splice plate of said third plurality of splice plates from each other.

20. The busway system of claim 12, wherein each splice plate of said first plurality of splice plates, and each said corresponding splice plate of said second plurality of splice plates, and each said corresponding splice plate of said third plurality of splice plates is associated with one of a distinct electrical phase, ground, or neutral.

21. The busway system of claim 12, wherein said busway joint further comprises: a housing comprising a first housing portion, and a second housing portion, at least one of said first and said second housing portions configured and arranged for a longitudinal movement with respect each other, between a first compressed position and a second extended position;

said first, said second, and said third plurality of electrically conductive splice plates being at least partially disposed within said housing.

22. The busway system of claim 21, wherein a portion of said first housing portion is arranged and disposed to overlap at least a portion of said second housing portion.

\* \* \* \* \*

UNITED STATES PATENT AND TRADEMARK OFFICE
CERTIFICATE OF CORRECTION

PATENT NO. : 8,540,526 B2  
APPLICATION NO. : 13/338469  
DATED : September 24, 2013  
INVENTOR(S) : Mooney et al.

Page 1 of 1

It is certified that error appears in the above-identified patent and that said Letters Patent is hereby corrected as shown below:

In the Specification

In Column 2, Line 66, delete "in an" and insert -- in a --, therefor.

In Column 8, Line 30, delete "first tab member 128b" and insert -- first tab member 128a --, therefor.

In Column 8, Line 32, delete "first tab member 128b" and insert -- first tab member 128a --, therefor.

In Column 8, Lines 34-35, delete "first tab member 128b." and insert -- first tab member 128a. --, therefor.

In Column 9, Lines 4-5, delete "second tab members 129b." and insert -- second tab members 128b. --, therefor.

In Column 14, Lines 11-12, delete "second insulator plate first adjustment portion 278" and insert -- second insulator plate first adjustment portion 178 --, therefor.

In Column 14, Line 35, delete "third bottom surface 124b" and insert -- third bottom surface 124c --, therefor.

In Column 14, Lines 59-60, delete "third bottom surface 124b" and insert -- third bottom surface 124c --, therefor.

In the Claims

In Column 19, Line 34, in Claim 3, delete "east" and insert -- least --, therefor.

Signed and Sealed this  
Thirty-first Day of December, 2013

Margaret A. Focarino  
*Commissioner for Patents of the United States Patent and Trademark Office*